US011363108B2

(12) United States Patent
Webber et al.

(10) Patent No.: US 11,363,108 B2
(45) Date of Patent: Jun. 14, 2022

(54) NETWORK LATENCY DETECTION

(71) Applicant: FullStory, Inc., Atlanta, GA (US)

(72) Inventors: Joel Grayson Webber, Decatur, GA (US); Joshua Calvin Teague, Marietta, GA (US)

(73) Assignee: FullStory, Inc., Atlanta, GA (US)

( * ) Notice: Subject to any disclaimer, the term of this patent is extended or adjusted under 35 U.S.C. 154(b) by 71 days.

(21) Appl. No.: 16/439,961

(22) Filed: Jun. 13, 2019

(65) Prior Publication Data

US 2020/0396303 A1 Dec. 17, 2020

(51) Int. Cl.
*H04L 67/50* (2022.01)
*H04L 41/22* (2022.01)
*H04L 43/065* (2022.01)

(52) U.S. Cl.
CPC .............. *H04L 67/22* (2013.01); *H04L 41/22* (2013.01); *H04L 43/065* (2013.01)

(58) Field of Classification Search
None
See application file for complete search history.

(56) References Cited

U.S. PATENT DOCUMENTS

| | | | |
|---|---|---|---|
| 10,868,881 B1* | 12/2020 | Chang | H04L 67/2814 |
| 2011/0213822 A1* | 9/2011 | Yavilevich | H04L 67/02 709/202 |
| 2014/0132571 A1* | 5/2014 | Zeng | G06F 3/04883 345/178 |

* cited by examiner

*Primary Examiner* — Kevin T Bates
*Assistant Examiner* — Emad Siddiqi
(74) *Attorney, Agent, or Firm* — Fish & Richardson P.C.

(57) ABSTRACT

Methods, systems, and apparatus, including computer programs encoded on a computer storage medium, for providing user interface development tools. In one aspect, a method includes receiving, from a client device, network request data that specifies, for each of multiple network requests that were transmitted from the client device to a server during a user session, a requested user interface element and a load time that indicates a duration of time between a time at which the network request was initiated and a time at which the user interface element was loaded in a user interface at the client device. An interactive interface is generated. The interactive interface includes a session replay area that presents playback of visual changes of the one or more user interfaces that occurred during the user session and a network request area that presents a list of network requests that were transmitted during the user session.

18 Claims, 11 Drawing Sheets

NETWORK LATENCY DETECTION

BACKGROUND

User interfaces facilitate user interaction with various resources and applications. For example, user interfaces generally include various interactive elements that enable a user to input data (e.g., using text boxes), make data selections (e.g., using radio buttons, check boxes, or drop down menus), navigate to resources or application pages (e.g., by interacting with an embedded link), and change visual aspects of the user interface (e.g., rotating a device, resizing a window, scrolling to other portions of a document, or using zoom controls). User satisfaction with a given website or application can depend on the user's experience with the user interface.

SUMMARY

In general, one innovative aspect of the subject matter described in this specification can be embodied in methods that include receiving, from a client device, network request data that specifies, for each of multiple network requests that were transmitted from the client device to a remote server during a user session, a requested user interface element and a load time that indicates a duration of time between a time at which the network request was initiated by the client device and a time at which the user interface element was loaded in a user interface at the client device; and generating and providing an interactive interface that includes: a session replay area that presents playback of visual changes of the one or more user interfaces that occurred during the user session; a network request area that presents a list of network requests that were transmitted during the user session and, for each network request in the list, the load time for the network request; and an animation that visually specifies, during playback of the visual changes to the one or more user interfaces in the session replay area, which network request in the list of network requests was initiated by the client device as the visual changes occurred during the user session. Other embodiments of this aspect include corresponding methods, apparatus, and computer programs, configured to perform the actions of the methods, encoded on computer storage devices.

These and other embodiments can each optionally include one or more of the following features. In some aspects, the network request area includes a waterfall chart that includes a bar for each network request in the list, the bar for each network request including a first end that indicates a time at which the network request was initiated and a second end that indicates a time at which the user interface element requested by the network request was loaded in the user interface. A length of the bar between the first end and the second end indicates the load time for the network request.

In some aspects, the animation includes presenting a network request identifier element next to the network request in the list that was generated by the client device as the visual changes occurred during the user session.

In some aspects, the client device generates the network request data, including identifying, for a given network request, at least one of (i) a request message body that includes data being transmitted with the given network request and by the client device or (ii) a received message body that includes data received by the client in response to the given network request, examining each message body to identify portions of data having a data type that is not included in a whitelist of data types, removing the identified portions of data from each message body, and including, in the network request data, each remaining portion of data of each message body.

Some aspects can include detecting selection of a given network request in the list of network requests and visually updating the interactive interface to present a network request details panel that includes a timing summary for the given network request. The timing summary can include measured time durations for events related to requesting and loading a given user interface element that was requested by the given network request. The timing summary for the given network request can include one or more measured time durations for processes performed by the client device to request and load the given user interface element and one or more measured time durations related to waiting to receive the given user interface element from the remote server. The timing summary for the given network request can include data specifying the given user interface element and a data size of the given user interface element.

Some aspects can include detecting user interaction with a given network request in the list of network requests and causing the playback of the visual changes to the one or more user interfaces to present visual changes that occurred when the given network request was initiated. In some aspects, the interactive interface can include an event stream area that includes information about pages presented by the client device during the user session. The information can include, for a page that is being presented in the session replay area, page speed metrics that each indicate a duration of time taken to reach particular milestones in loading the page. The page speed metrics can include a first meaningful paint metric that indicates a duration of time between a time at which the client device requests the page and a time at which the client device renders at least one of text, an image, or a canvas of the page at a display of the client device. The page speed metrics can include a Document Model Object (DOM) content loaded metric that indicates a duration of time between a time at which the client device requests the page and a time at which the client device loads and parses an initial markup language document of the page. The page speed metrics can include a page load metric that indicates a duration of time between a time at which the client device requests the page and a time at which the client device renders an entirety of the page.

Particular embodiments of the subject matter described in this specification can be implemented so as to realize one or more of the following advantages. An interactive user interface can present playback of visual changes to user interfaces that occurred during actual user sessions along with additional data related to events that occurred during the user sessions so that user interface developers can visualize how the events affect the user experience. The additional data can include console logs that were generated on the user device to provide insight into the events that occurred on the client side, which is normally not available to the publisher's server. An animation can visually specify the console entries that were generated by the user device as the visual changes occurred during the user session, which enables user interface developers to visually link the events of the console logs to the visual changes to the user interfaces as the events occurred. This enables the user interface developers to more easily assess the effects of errors and to more easily diagnose why the errors are occurring.

The additional data can also include a list of network requests for user interface elements that were loaded on one or pages during the user session along with a load time for each element, enabling user interface developers to determine why some pages load slowly. For example, the techniques discussed in this document can enable a system to distinguish between delays that occurred because of the user accessing an online resource over a slow network from the delays that occurred because of delays that occurred at (or were caused by) the user device. In this way, these techniques enable the identification of the sources of delays, and enable changes to be made to reduce the delays that occur at the user devices. By presenting the load times with the playback of the user session, the user interface developers can also visualize the impact that the slow loading pages have on the user experience. Another animation can visually specify the network requests that were generated by the user device as the visual changes occurred during the user session, which enables user interface developers to visually link the network requests and their corresponding elements to delays in loading the elements during the user sessions. In other words, if there is a particular script or other component that is the source of significant delay, that particular script or component will be identified as the source of the delay so that corrective action can be taken to reduce the delay attributable to that script or component.

Private and sensitive data that would normally be included in data transmitted from the user device to another server system, e.g., of an evaluation apparatus, can be protected by the user device only transmitting to the servers whitelisted data and redacting any data that is not whitelisted.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is an illustration of an example interactive user interface for replaying a user session and presenting data related to events that occurred during the session.

FIG. 9 is an illustration of an example interactive user interface for searching for user sessions.

Like reference numbers and designations in the various drawings indicate like elements.

DETAILED DESCRIPTION

Figure 1:
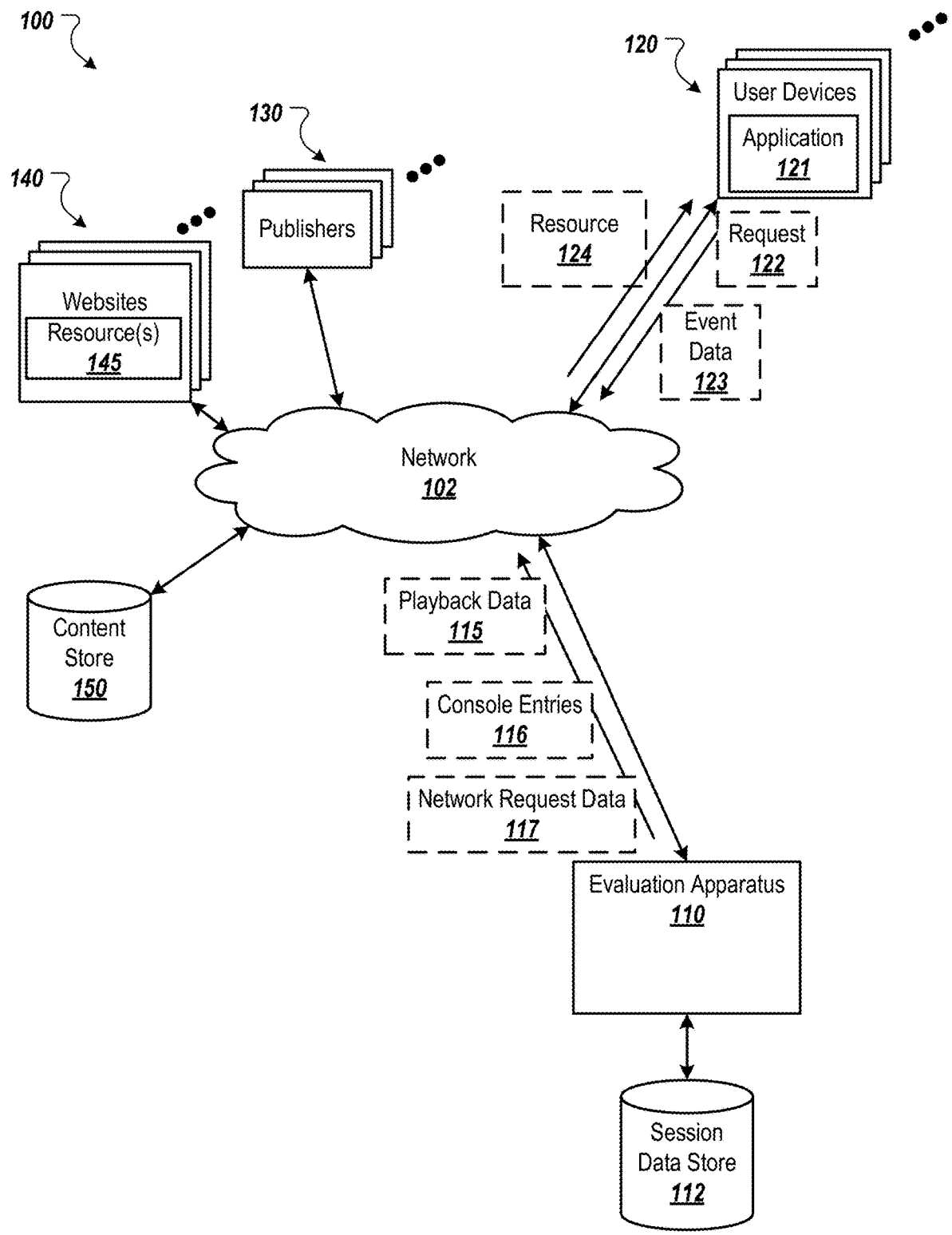
FIG. 1 is a block diagram of an example environment in which users interact with user interfaces.

Publishers (e.g., an entity that provides a user interface) generally want to make user interfaces user friendly so that users will have a positive experience. Having information about user interactions with a given user interface (e.g., a web page or an application interface) and events that occur during user sessions with user interfaces can help a publisher identify aspects of the user interfaces that can be changed to improve the user experience. This document discusses web development tools for collecting information about events that occur during user sessions with user interfaces and for generating interactive user interfaces that include playback of visual changes to the user interfaces during the user sessions and data related to events that occurred during the user sessions. The development tools can provide, for example, interactive user interfaces that include console views and network views, network details such as network requests and load times for the requests, page speed metrics, and identification and presentation of the slowest pages of a publisher. The interactive user interfaces are also referred to herein as development tool interfaces to distinguish from the user interfaces presented during user sessions for which the development tool interfaces provide playback and other data.

A development tool interface can present, along with playback of a user session that occurred at a user device, console entries for user interface events that occurred during the user session. The development tool interface can also include an animation that visually specifies which console entries were generated by the user device as the visual changes occurred during the user session. This enables a user interface developer to link the events to the visual changes to the user interface and visualize the impact of the events, e.g., errors, to the user experience.

The development tool interface can also present a list of network requests generated by the user device during the user session and, for each network request, a load time taken to obtain and load a user interface element requested by the network request. Each network request can be for a given user interface element that is loaded by a page during the user session. This enables a user interface developer to determine which elements are causing pages to load slowly and why the elements are loading slowly. When displayed with the playback of the user session, the loads times also provide insight into how the user experience changed due to slow loading pages.

These development tool interfaces enable users to view, along with playback of user sessions, console and network details for the user sessions as they occurred for real users in real environments. The development tool interfaces can also present page speed metrics for page timing milestones for each page that loads during a user session. The page speed metrics can include times taken for the first meaningful pain, for the Document Object Model (DOM) content being loaded, and/or for the entire page to load. The page speed metrics can help a user interface developer understand whether a page was rendering or loading slowly for any individual user. For the purpose of this document, a page refers to a logical page that may correspond to different Universal Resource Locators (URLs), e.g., to different dynamic URLs, as described in more detail below.

The console data, network request data, page speed metrics, and data used to generate playback of user sessions can be indexed and stored such that user interface developers can search for user sessions that include particular attributes, e.g., pages that took more than a threshold duration of time to load or pages that took more than a threshold duration for the first meaningful paint to complete. Metrics can also be aggregated across user sessions to provide insights into various pages, e.g., to determine the slowest loading pages of a publisher. Although the techniques described below are described largely in terms of pages presented by web browsers, similar techniques can be used to present similar data for native application content, e.g., native application pages. Thus, any reference to page or web page in this document is equally applicable to native application user interface views.

FIG. 1 is a block diagram of an example environment 100 in which users interact with user interfaces. The example environment 100 includes a network 102, such as a local area network (LAN), a wide area network (WAN), the Internet, or a combination thereof. The network 102 connects user devices 120, publishers 130, websites 140, and an evaluation apparatus 110. The example environment 100 may include many different user devices 120, publishers 130, and websites 140.

A website 140 is one or more resources 145 associated with a domain name and hosted by one or more servers. An example website is a collection of web pages formatted in hypertext markup language (HTML) that can contain text, images, multimedia content, and programming elements, such as scripts. Each website 140 is maintained by a publisher 130, which is an entity that controls, manages and/or owns the website 140.

A resource 145 is any data that can be provided over the network 102. A resource 145 is identified by a resource address that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A user device 120 is an electronic device that is capable of requesting and receiving resources over the network 102. Example user devices 120 include personal computers, mobile communication devices, and other devices that can send and receive data over the network 102. A user device 120 typically includes a user application 121, such as a web browser, to facilitate the sending and receiving of data over the network 102. The user device 120 can also include other user applications 121, such as native applications developed for a particular platform or a particular device. Publishers 130 can develop and provide the native applications to the user devices 120.

A user device 120 can submit a resource request 122 that requests a resource 145 from a website 140. In turn, data representing the requested resource 124 can be provided to the user device 120 for presentation by the user device 120. The requested resource 145 can be, for example, a home page of a website 140, a web page from a social network, or another resource 145. The data representing the requested resource 124 can include data that cause presentation of content (e.g., embedded content such as text that is included in the code of the resource) at the user device 120. The data representing the requested resource 124 can also include instructions that cause the user device 120 to request remote content from a content store 150. The remote content can include, for example, images, content that is updated periodically, content used across multiple different resources, or content provided by third parties (e.g., other than the publisher). Thus, the remote content can be updated or changed without having to update the resource code.

The evaluation apparatus 110 provides a set of web development tools that enable publishers 130, e.g., user interface developers of the publishers, to evaluate their user interfaces, analyze errors that occurred in actual user sessions, understand what causes pages to load slowly and the impacts of slow loading pages, and gain insight into actual user sessions. The web development tools include interactive user interfaces, views and animations in the interactive user interfaces, and metrics, e.g., page speed metrics, collected and/or computed based on data received from the user devices 120.

The evaluation apparatus 110 collects event data 123 from the user devices 120. As used throughout this document, the phrase event data refers to data obtained from a user device 120 during a user session. The event data 123 for a user session can include one or more console logs that include console entries that each specify a message logged to a browser's console during the user session. The console logs provide information about specific events, including errors, that occurred and can document different states of the user session. The console logs can include, for at least some of the messages, timestamp information that indicates a time at which the message was generated. This timestamp information enables the evaluation apparatus 110 to synchronize the console entries with the playback of the visual changes to the user interface(s) during the user session.

Because the console logs are generated by the browser on the user device 120, the data of the console logs is generally not reported to a remote server absent the use of the present technology. Instead, in prior systems, the data of the console logs remains local to the user device, and therefore is not used in the manner discussed throughout this document. Obtaining this data enables the evaluation apparatus 110 to present the console messages with playback of the user session and to visually specify which console entries in the console logs were generated as the visual changes occurred during the user session. This data is important in understanding what the user device is doing when rendering online resources, and particularly important for figuring out why errors occur client side, e.g., when the error may not be universally experienced by all user devices. As such, the collection and use of this data is applied to a practical application that allows for the identification and correction of errors that would otherwise be hidden.

The event data 123 can also include network request data. The network request data for a user session can include data specifying each network request transmitted over the network 102 by the web browser during the user session. For each network request, the network request data can specify the user interface element that was requested by the network request, timestamp information that indicates a time at which the network request was transmitted, and one or more time durations associated with loading the requested user interface element. For example, the user interface element can be text, an image, a video, scripts, a stylesheet, e.g., a Cascading Style Sheet (CSS), a document, or other appropriate type of user interface element.

In some implementations, code for obtaining the network request data is inserted into code of a web browser or native application. For example, code can be inserted into a browser's network APIs to capture network requests and the data of the network requests.

The time durations can be measured by the user device 120, e.g., by the browser or a plugin of the browser. The time durations can include a total duration of time between a time at which the network request was transmitted and a time at which the requested user interface element was loaded by the browser. The time durations can also include stall time duration that is a duration of time that the user device stalled before transmitting the network request. For example, the network request may be held in one or more queues for some time before the user device 120 is able to transmit the network request. The stall time duration can indicate the time spent waiting because there were higher priority requests in the queue or no more open connections.

The time durations can also include a Domain Name System (DNS) lookup time duration that is a duration of time taken by the browser to perform a DNS lookup, e.g., to request an Internet Protocol (IP) address for a domain from a DNS server. The time durations can also include an initial connection time duration that is a duration of time taken by the browser to establish an initial connection with a server from which the user interface element is being requested.

The time durations can also include a Secured Socket Layer (SSL) time duration that is a duration of time taken by the browser to complete an SSL handshake with the server. The time durations can also include a send and wait time duration that is a duration of time for an initial round-trip of the request, e.g., from the time the request is sent to the time at which the first data received in response to the request. The time durations can also include a receive time duration that is the time spent receiving the rest of the data from the remote server, which is generally related to the size of the file that contains the user interface element.

The evaluation apparatus 110 can use these time durations to determine, for user sessions in which pages or user interface elements loaded slowly, whether the user device 120 or the network communications and/or a server that provides the user interface elements was the cause of the slowness. For example, high stalled times are an indication that the user device 120 caused a page to load slowly, whereas high send and wait times are an indication that network communications and/or a slow server caused the page to load slowly.

The evaluation apparatus 110 can identify, as a slow-loading page, a page that had a load time duration that exceeds a load time threshold. For the slow-loading page, the evaluation apparatus 110 can aggregate, e.g., determine the average or sum of, each time duration across all of the user interface elements loaded on the page. The evaluation apparatus 110 can compare the aggregate values to determine whether the slowness was caused by the server or the user device. For example, if the average stall time exceeds a sum of the average send and wait time and the receive time, the evaluation apparatus 110 can determine that the user device 110 is the cause of the slowness.

The evaluation apparatus 110 can also determine aggregate values of each time duration per type of device and/or geographic location of the user device when the user session occurred. In this way, the evaluation apparatus 110 can identify types of devices or locations that have aggregated time durations that are significantly greater than other types of devices or location, e.g., greater than an average time duration for each other type of device or location.

The event data 123 can also include page speed metrics. The page speed metrics can include metrics that show page timing milestones for each page that loads during a user session. The page speed metrics can include a first meaningful paint metric, a DOM content loaded metric, and/or a page load metric. The first meaningful paint metric indicates a duration of time between a time at which a page is requested and a time at which a first meaningful paint occurs for the page. The first meaningful paint can be an event that occurs at the moment when the biggest "above-the-fold" layout change has happened and when web fonts have loaded for the page. For example, the first meaningful event can occur when the browser has rendered any text, image (including background images), non-white canvas, or SVG. The first meaningful paint marks the moment at which users can start consuming content on a page.

The page DOM content loaded metric indicates how long it took for the HTML to load so that the page can start rendering content. For example, the DOM content loaded metric can indicate a duration of time between a time at which the page was requested and a time at which the initial HTML document has been loaded and parsed. Often this milestone occurs before stylesheets, images, and subframes finish loading, so the DOM content loaded event can occur before a page is done painting.

The page load metric indicates how long it takes for the whole page and all of its dependent resources to finish loading. For example, the page load metric can indicate a duration of time between a time at which the page was requested and a time at which the whole page and all of its dependent resources have finished loading. The page load event often occurs after the point in time when the page is rendered and interactive for a user.

The page speed metrics can be determined client side, e.g., by the user device 120. For example, the page speed metrics can be determined using a browser's (or other application's) performance API. The performance API provides access to performance-related information for a resource. For example, the performance API can include methods and event listeners that can detect events (e.g., when a layout change has occurred for the first meaningful paint metric) and measure durations of time between events. The performance API also includes methods that can be inserted into resources to mark when events occur. The marks can then be used to determine a duration of time between events. For example, a resource can include a method that marks when the DOM is loaded. The time of the this mark and the time at which the resource was requested by the user device 120 can be used to determine the page DOM content loaded metric for the resource.

In some implementations, the network request data can also include the bodies, e.g., the payload, of the messages included in network requests and/or the bodies of the messages included in responses to the network requests. For example, the web browser or a plugin of the browser can log each message body and provide at least some of the content of the message bodies to the evaluation apparatus 110.

In some implementations, the browser only provides whitelisted content of the message bodies to the evaluation apparatus 110. For example, some message bodies may include sensitive or private data. In a particular example, if a person is logging into an account, the data of a network request may include a username and/or password. The browser can determine whether content of a message body is specified by a whitelist. If so, the browser can provide the content to the evaluation apparatus 110. If not, the browser can redact the content.

To determine whether content is whitelisted, the browser can compare the message field that includes the content, e.g., the tags between which the content is located, to the whitelist. For example, the message field or tags can indicate the type of content included in the field. If the message field or tags are not whitelisted, the content in the field or between the tags can be redacted from the message body data sent to the evaluation apparatus 110.

The event data 123 can also include data that can be used to playback the user session. For example, the event data 123 can include session replay data that is obtained and stored, and then used to generate playback data that presents visual changes to user interfaces during the user session and other activity (e.g., mouse movements) that occurred during the user session. The session replay data can include interface data, user interaction data, and/or mutation data.

The interface data specifies a structure of a user interface that is presented at a user device during the session. For example, when the user device 120 renders a resource, the interface data can be an initial DOM of the resource that is first presented at a user device 120. In this example, the DOM would specify that the resource 105a initially presented. The user interaction data specify user interactions at the user device, and include user interactions with the elements of the user interface. The user interaction data can specify mouse movements, user clicks, mouse hovers, highlights, text inputs, and any other user interactions that are performed at the user device.

The mutation data can specify each element that is rendered by the user device 120, and the mutation data can be provided to the evaluation apparatus 110 (e.g., either sequentially or in sets of mutation data that were accumulated over a specified time by the user device 120). Using the mutation data, the evaluation apparatus 110 can reconstitute the DOM in a manner similar to that performed by a browser. The mutation data can be obtained, for example, by inserting a mutation observer script in the code of the resource (or native application). The mutation of observer script can monitor the resource for changes to the structure of the resource, record mutation data representing the changes in local memory at the user device 120, and provide the mutation data to a specified location (e.g., the evaluation apparatus 110). Providing mutation data rather than recorded video of the user session reduces the amount of data that has to be recorded and transferred across the network 102. This limits the negative latency impact and bandwidth consumption of this technology.

Example techniques for obtaining event data that can be used to playback user sessions are described in U.S. Pat. No. 9,766,769, filed on Dec. 31, 2014, entitled, "Evaluation of Interactions with a User Interface," and U.S. patent application Ser. No. 16/038,002, filed on Jul. 17, 2018, entitled "Capturing and Processing Interactions with a User Interface of a Native Application," which are herein incorporated by reference.

As used throughout this document, a user session is a period of user interaction with a user interface, e.g., of a website or native application. In the context of a website, the user session can begin when a user requests a first resource from a given domain (e.g., example.com) and can end when a session end condition is met. In the context of a native application, the user session can begin when the user launches the native application and can end when a session end condition is met. The session end condition can be considered met when a specified amount of time elapses since a user interaction with a resource from the given domain or the native application. For example, if a user has not interacted with a resource from the given domain or the native application for 30 minutes (or some other amount of time), the session end condition can be considered to be met, thereby ending the session.

The session end condition can also be considered met when a session termination event occurs. The session termination event can be, for example, receipt of a session end message indicating that the user navigated away from the given domain or closed the browser, or a message specifying that the user closed the native application. Note that the session termination event may be stored at the user device 120 for some time (e.g., until the user reopens the browser or again launches the native application) prior to the user device 120 submitting the session end message to the evaluation apparatus 110.

The event data 123 can be transmitted to the evaluation apparatus 110 in one or more data transmissions. For example, each type of event data 123 can be sent separate from each other type of event data. In another example, the event data 123 for each page can be transmitted to the evaluation apparatus 110 after the page has loaded on the user device 120.

The evaluation apparatus 110 receives the event data 123 from the user device 120 and stores the event data 123 in a session data store 112. For example, the evaluation apparatus 110 can store the event data 123 in an index of session data that is stored in the session data store 112. The index of session data can include, for each user session, the event data 123 received for that user session and optionally additional data, such as context data relating to user device 120 (e.g., the type of user device 120, the make and model of the user device 120, hardware and/or software of the device, the geographic location of the device, etc.). The software specified by the context data can include the type of browser, version of the browser, or other data about the browser.

The evaluation apparatus 110 can index the event data 123 and the contextual data in the session data store 112. This enables a user to search for user sessions that include particular events or attributes. For example, the evaluation apparatus 110 can receive a query for one or more attributes, e.g., a type of browser and first meaningful paint metrics that exceed a specified threshold. The evaluation apparatus 110 can use the index to identify each user session that occurred using the type of browser specified by the query and that had a first meaningful paint metric for one or more pages that exceeds the specified threshold. The evaluation apparatus 110 can then provide data that presents the identified user sessions in an interactive interface.

The evaluation apparatus 110 can also determine aggregate metrics for pages (or for other attributes) based on the event data 123 and/or contextual data stored in the session data store 112. One example metric is an average page load time for each page of a publisher 130. The average load time can be an average of the total load time metric for the page across multiple user sessions. This average load time metric enables the evaluation apparatus 110 to identify and present data showing the publisher's slowest loading pages and their respective average load times.

Other example metrics for pages can include a maximum load time taken for the page to load at a user device and a minimum time taken for the page to load at a user device. The evaluation apparatus 110 can determine the maximum and minimum loads times by comparing the load time for the page across multiple user sessions on multiple user devices.

The evaluation apparatus 110 can determine the metrics for the pages based on device type, operating system, operating system version, browser, browser version, and/or other attributes. For example, the evaluation apparatus 110 can determine the average, maximum, and minimum load time for a page when the page is loaded using a first browser and the same metrics for the page when the page is loaded using a second web browser. A comparison of these metrics, e.g., by the evaluation apparatus 110 or by a publisher viewing the metrics on a user interface generated by the evaluation apparatus 110, can reveal which browser is performing better at loading the page, which points to how the page may need to be optimized for the slower browser. A similar comparison based on device type or operating system can reveal similar information, enabling the publisher to optimize the page based on device type or operating system.

As some pages can be referenced by different URLs, e.g., dynamic URLs, the evaluation apparatus 110 can determine the logical pages of a publisher's website or application, e.g., using machine learning techniques. Example techniques for identifying logical pages are described in U.S. patent application Ser. No. 15/896,167, filed on Feb. 14, 2018, entitled "User Interface Structural Clustering and Analysis," which is herein incorporated by reference. The evaluation apparatus 110 can determine the average load time for each logical page, determine which logical pages have the slowest load times, and provide data identifying the slowest loading logical pages, e.g., in one or more interactive interfaces.

The evaluation apparatus 110 can generate and provide, for a user session, development tool interfaces that include playback data 115 that presents visual changes to the user interface(s) of page(s) presented during the user session, console entries 116 of console logs generated during the user session, network request data 117 that includes network requests generated during the user session, and/or additional data related to the user session. Some example development tool interfaces generated and provided by the evaluation apparatus 110 are illustrated in FIGS. 2-10 and described below.

Figure 2:
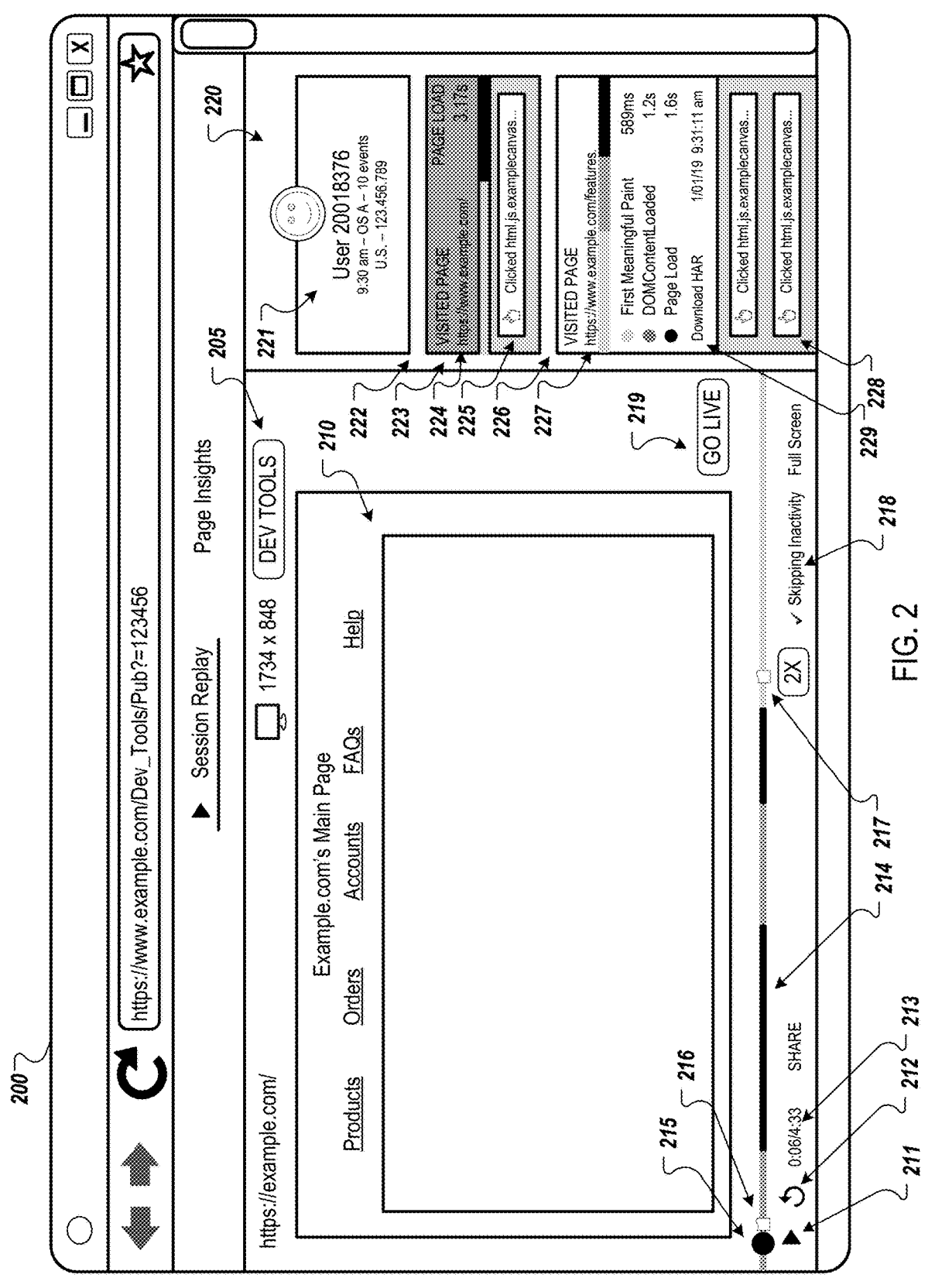

FIG. 2 is an illustration of an example interactive user interface 200 for replaying a user session and presenting data related to events that occurred during the session. FIGS. 3-8 are illustrations of examples updates to the user interface 200 of FIG. 2 during the playback of an example user session. The example user session begins with the loading of a main page, "www.example.com." During the user session, the user navigates to two additional pages, a features page ("www.example.com/features") and a frequently asked questions page ("www.example.com/FAQ")

The example user interface 200 includes a session replay area 210 in which playback of visual changes to one or more user interfaces that occurred during the user session are presented. For example, the session replay area 210 can present a "real-time" replay of the user session based on the events that occurred during the user session and changes to the user interfaces that occurred during the user session, e.g., based on the events. For example, if the user navigated from a first page to a second page ten seconds into the user session, the replay of the user session can present the transition from the first page to the second page ten seconds into the replay.

The user interface 200 includes replay controls that include a play/pause control 211, a replay control 212, a counter 213, an inactivity skipping control 218, a go live control 219, a playback bar 214. The play/pause button 211 enables a user, e.g., a publisher or user interface developer of a publisher, to start and stop replay of the user session by interacting with the play/pause button 211. The counter 213 provides a total duration of the user session (e.g., 4 minutes 33 seconds) and a portion of the user session that is currently being presented (e.g., 6 seconds). The inactivity skipping control 218 enables a user to toggle between skipping periods of inactivity during the user session and not skipping the periods of inactivity. For example, if a user is viewing a page without interaction for a period of time and the page is not changing during this period of time, this period of time can be skipped in the playback of the user session when the inactivity skipping control 218 is active. This enables the user to skip portions of the user session that may not be of interest to the user.

The playback bar 214 includes a sliding element 215 that indicates the portion of the user session currently being presented and enables a user to quickly move to other portions of the user session by sliding the sliding element 215 within the playback bar 214. In this example, the sliding element 215 is near the left side of the playback bar 214, indicating that the portion of the user session currently being presented is six seconds into the user session.

The playback bar 214 also includes page change elements 216 that indicate when a different page was presented during the user session. For example, a user may navigate to multiple pages during a single user session. The page change elements show when these pages change events occur on the playback bar 214, enabling a user to quickly move to portions of the user session in which page change events occur or to the portions of the user session in which a particular page was presented.

The playback bar 214 can be color-coded based on whether the user was actively interacting with the user interface. For example, portions of the playback bar 214 that correspond to playback of the user session when the user was active can be presented in a first color and portions of the playback bar 214 that correspond to playback of the user session when the user was inactive can be presented in a second color different from the first color. In addition, the portions of the playback bar 214 that correspond to playback of the user session when the user was active can be color-coded based on whether the user viewing the playback has viewed that portion of the user session. Viewed portions can be a first color and unviewed portions can be a second color different from the first color. The playback bar 214 can also include gaps, e.g., that are the same color as the background or a different color, to represent when the user was absent (e.g., no page was opened or the application was closed), but came back and continued the session later.

The go live control 219 enables a user to fast forward to a live view of a user session that is currently active. For example, the session replay area 210 can present active user sessions that are occurring while a user, e.g., a user interface developer of a publisher, is viewing the user interface 200. The user can go back and watch portions of the user session that have already occurred using the sliding element 215. If the user wants to return to a live view of the user session, the user can interact with the go live control 219. In response, the evaluation apparatus 110 can return to the live view of the session in the session replay area 210. The live view may be delayed a short amount of time based on the time required to transmit data over the network and to generate the playback data using the event data received from the user device. However, the technology described herein can minimize this delay by, for example, transmitting mutation data rather than actual video of the user session.

The user interface 200 also includes a user session details area 220 that includes additional data about the user session. The user session details area 220 includes a session detail element 221 that includes details about the session, such as a user identifier for the user of the user session, a time at which the user session started, an operating system of the user device at which the user session occurred, a number of specified events that occurred during the user session, location information identifying a geographic location of the user device when the user session occurred, and an IP address of the user device when the user session occurred.

The user session details area 220 also includes an event stream area 222 that includes information about at least some of the events that occurred during the user session. In this example, the event stream area 222 includes information about two pages that were visited during the user session. In particular, the event stream area 222 includes a page view area 223 that includes a page view element 224 that indicates that the page "www.example.com" was presented during the user session and that it took 3.17 seconds to load this page. In addition, the page view area 223 includes an event element 225 for an event that occurred while the page was being presented. The event element 225 includes a brief description of the event, e.g., indicating that a canvas was clicked while the page was being presented, and an icon that represents the type of event, e.g., a hand in this example to represent a click event.

The event list area 220 also includes a second page view area 226 that includes a page view element 227 that indicates that the page "www.example.com/features" was presented during the user session. This page view element 227 also includes page speed metrics for the page. The page speed metrics include a first meaningful paint metric, a DOM content loaded metric, and a page load metric. Each page view element 224 and 227 can present the page speed metrics for the page referenced by the page view element 224 and 227 in response to user interaction with the page view element 224 and 227. In the illustrated example, a user may have interacted with the page view element 227, but not the page view element 224.

For example, the format of the page view element 224 may be a default format and the format of the page view element 227 may be an expanded format that includes the page speed metrics. An interaction with a page view element that is currently in the expanded format can cause the page view element to return to the default format.

The page view area 226 also includes an event element 228 that identifies multiple events that occurred while the features page was presented. The events included in event elements can be events that meet specified criteria. For example, the evaluation apparatus 110 can generate event elements for particular types of events that occurred during the user session and include the event elements in the user interface 200. The page view area 226 also includes a download HAR link that, when interacted with, initiates a download of a .HAR archive file that includes the console logs, network request data, and/or other data for the user session.

The visual characteristics of the page view elements 224 and 227, e.g., the color or shading of the page view elements 224 and 227, can vary based on whether the page is being presented in the playback of the user session in the session replay area 210. For example, the evaluation apparatus 110 can change the color or shading of the page view element for the page that is currently being presented in the playback of the user session so that the color or shading of this page view element is different from the color or shading of the other page view elements. In this example, the page view element 224 is a darker shade than the page view element 227 as the page being presented in the playback of the user session is "www.example.com."

As the playback progresses, the evaluation apparatus 110 can update the color or shading of the page view elements 224 and 227 based on the page that is being presented in the playback of the user session. For example, when the playback progresses past the page change element 216 that indicates that the user session transitioned from the main page (www.example.com) to the features page (www.example.com/features), the evaluation apparatus 110 can update the visual characteristics of the page view elements 224 and 227 to indicate that the features page is being presented in the playback of the user session. For example, the evaluation apparatus 110 can update the page view element 224 to a lighter shade and update the page view element 227 to a darker shade. In this way, the data for the page currently being presented in the playback of the user session is highlighted to the user viewing the playback.

The data included in the event stream area 222 can also be visually updated during the playback of the user session. The example user session includes presentation of three different pages, but the event stream area 222 of FIG. 2 only shows data for two of the pages. As the playback progresses, or if a user fast forwards the playback using the sliding element 215, the evaluation apparatus 110 can update the event list area to present a page view element and corresponding events for the page that is being presented by the playback of the user session. For example, during playback, the event stream area 222 can scroll to the various page view elements as the playback transitions between pages. In this way, the event stream area 222 shows data for the page and events being presented in the playback of the user session, without requiring the user to scroll or otherwise interact with the user interface 220 to view the data.

The user interface 200 also includes a dev tools control 205. The dev tools control 205 enables a user to view development tools that enable publishers to evaluate their user interfaces, analyze errors that occurred in actual user sessions, understand what causes pages to load slowly and the impacts of slow loading pages, and gain insight into actual user sessions.

Figure 3:
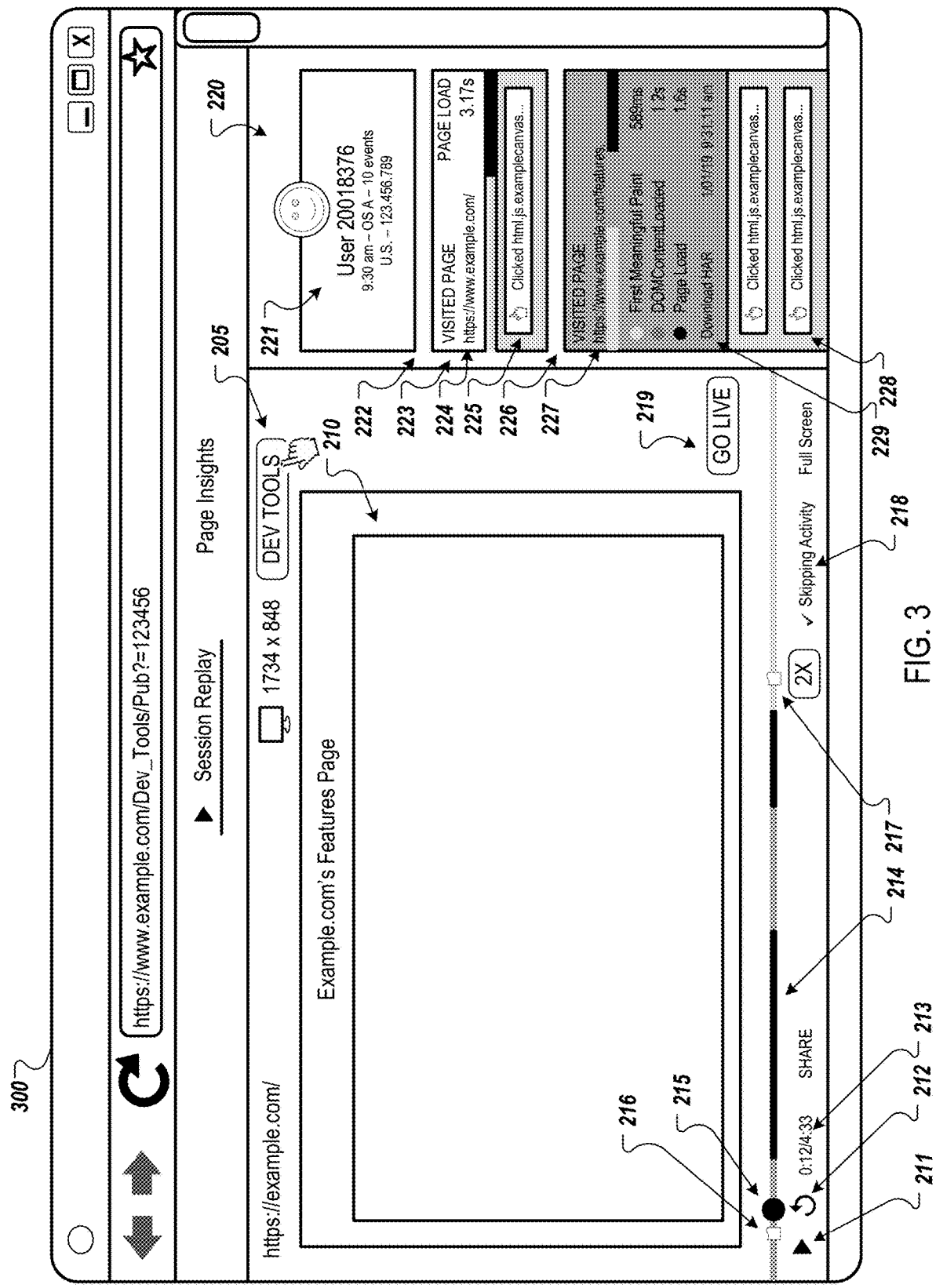
FIG. 3 is an illustration of another example interactive user interface for replaying a user session and presenting data related to events that occurred during the session.

FIG. 3 is an illustration of another example interactive user interface 300 for replaying a user session and presenting data related to events that occurred during the session. The user interface 300 is an updated version of the user interface 200 and includes many of the same elements at the user interface 200. In particular, the user interface 300 has been updated during playback of the session from 6 seconds into the user session to 12 seconds into the user session, as indicated by the counter 213 and the sliding element 215.

Between 6 seconds and 12 seconds in the user session, the user session transitioned from the main page to the features page, as shown in the session replay area 210. In addition, the evaluation apparatus 110 has updated the visual characteristics of the page elements 224 and 227 to indicate that the features page is being presented in the playback of the user session rather than the main page. In this example, the shading of the page element 224 has been lightened and the shading of the page element 227 has been darkened. In other examples, page elements for pages that are currently being presented in the playback can be displayed in a first color and page elements for pages that are not currently being presented in the playback can be displayed in a second color different from the first color. Other visual characteristics can also be used to distinguish between the pages, e.g., hatching, highlighting the borders of the page elements, etc.

Figure 4:
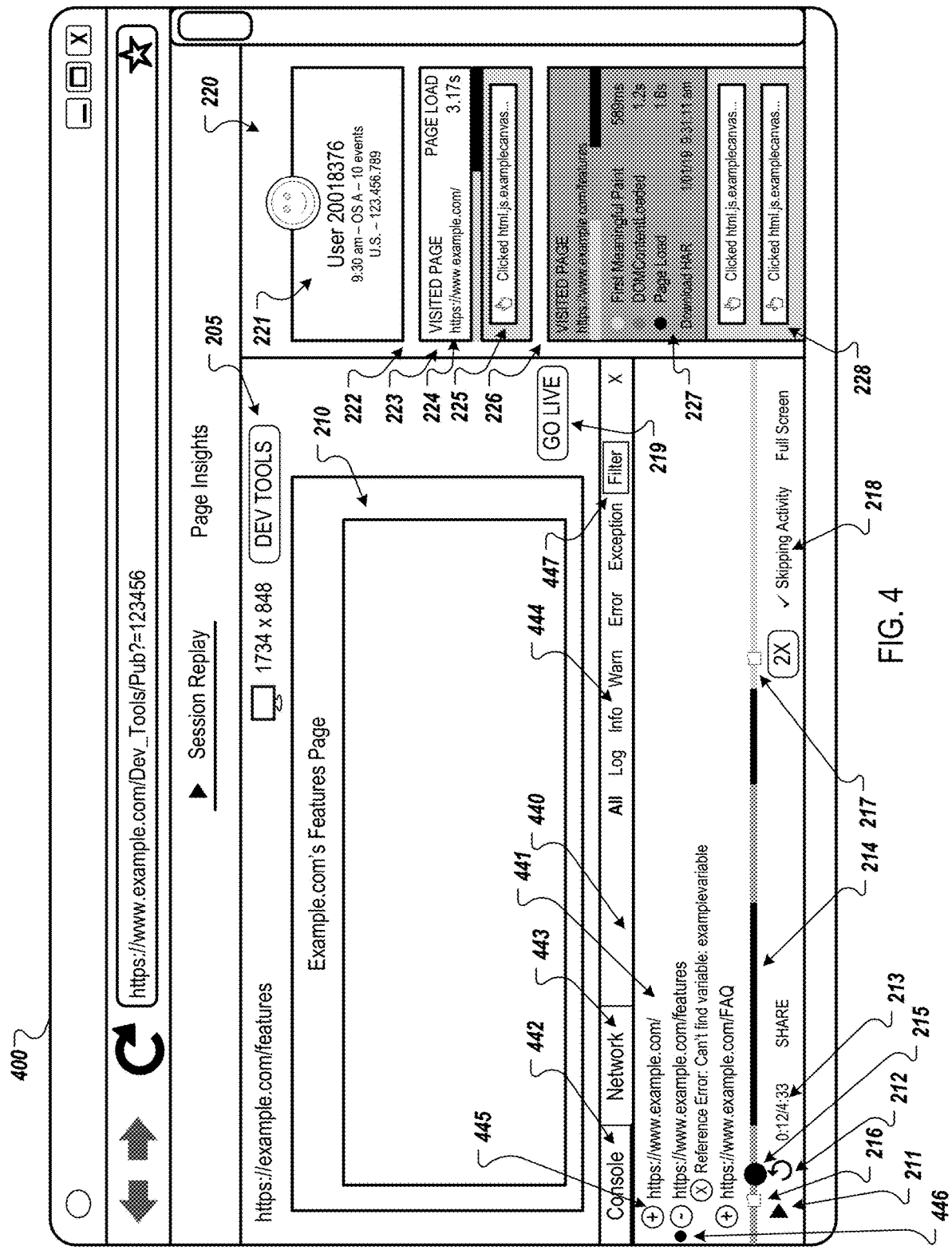
FIG. 4 is an illustration of another example interactive user interface for replaying a user session and presenting data related to events that occurred during the session.

As described above, the dev tools control 205 enables a user to view development tools for the user session. FIG. 4 is an illustration of another example interactive user interface 400 for replaying a user session and presenting data related to events that occurred during the session. The user interface 300 is an updated version of the user interface 300 and includes many of the same elements at the user interface 300. In particular, the user interface 400 is an updated version of the user interface 300 that is presented in response to user interaction with the dev tools control 205.

The user interface 400 includes a console log area 440 that includes console log entries 441 for user interface events that occurred during the user session. The console log area 441 includes a list of pages that were presented during the user session. For each page shown in the list, the console log area 441 includes an expansion control 445 that enables a user to view the console log entries 441 for the page. In this example, the console log entries for the features page are being presented.

Figure 6:
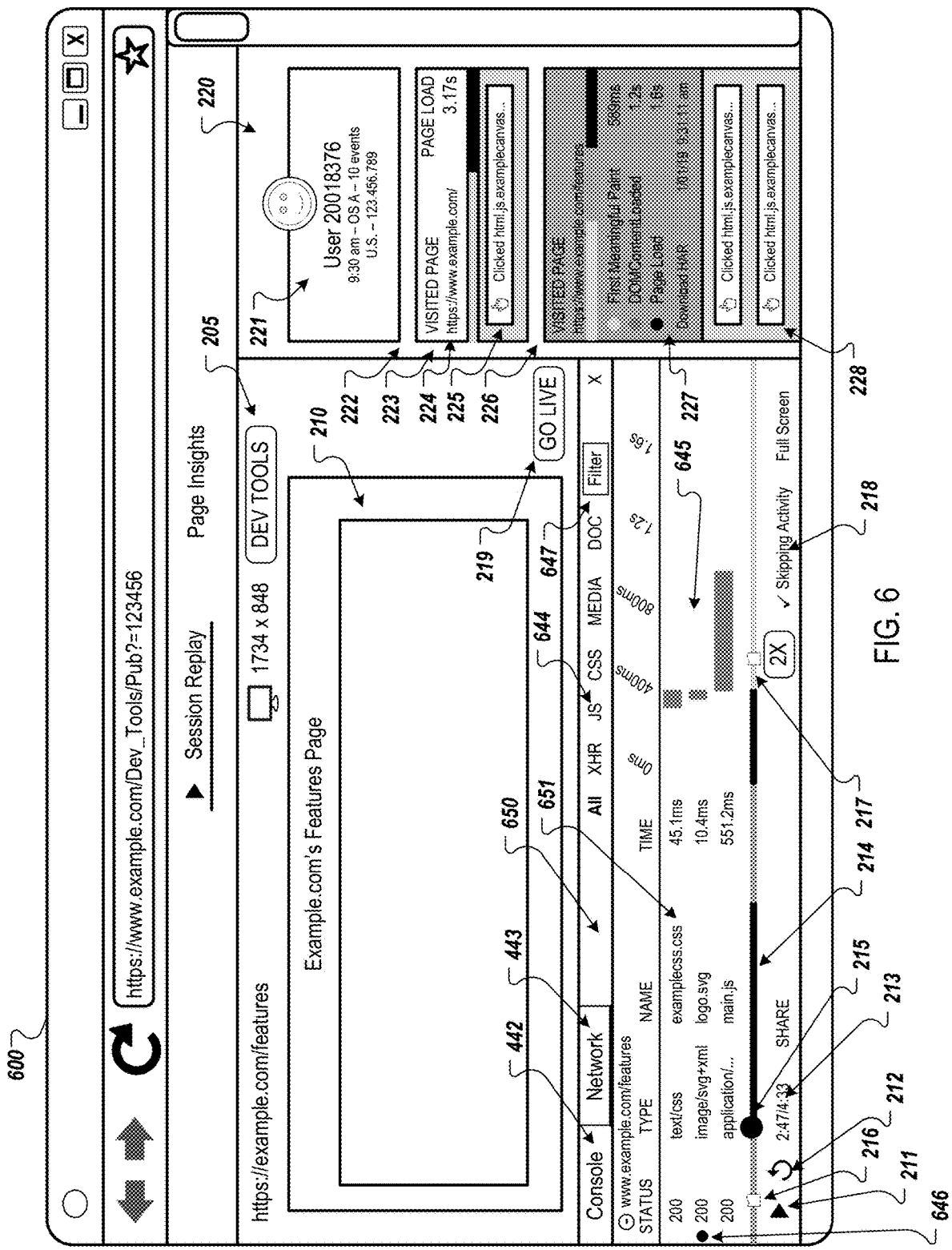
FIG. 6 is an illustration of another example interactive user interface for replaying a user session and presenting data related to events that occurred during the session.

The console log area 440 also includes a console view tab 442 and a network view tab 443. These tabs 442 and 443 enable a user to switch between a console log view that includes the console log area 440 and a network view that includes network request data, as shown in FIG. 6 and described below.

The console log area 440 also includes a filter menu 444 that enables a user to filter the console entries 441. In this example, all console entries are being presented in the console log area 440 as the "All" menu element is bolded. If a user interacts with the "Log" menu element, only console log entries for log events would be presented in the console log area 440. The filter menu 444 also includes a custom filter control 447 in which a user can specify a custom filter by which to filter the console log entries.

In many cases, the number of pages and/or the number of console log entries 441 that would be presented in the console log area 440 would exceed the display area of the console log area 440. A user can scroll up and down the list of pages and console entries by hovering over the console log entries 441 and scrolling up and down using a mouse wheel or using a scroll bar (not shown).

The evaluation apparatus 110 can also use one or more animations to present the console log entries for the page being presented in the playback of the user session in the session reply area 210. For example, the evaluation apparatus 110 can update the list of pages and console log entries 441 presented in the console log area 440 based on the playback of the user session in the session replay area 210. In particular, the console log area 440 can present a portion of the list of pages that includes the page being presented in the session replay area 210. In addition, the console log entries that were generated as visual changes to the page occurred can be presented in the console log area 440. While the playback of the session progresses, the list of pages and console log entries can be updated to show the pages and console entries for the portion of the user session being presented in the playback of the user session.

The evaluation apparatus 110 can also use an animation to specify, during playback of the visual changes to one or more user interfaces of the pages in the session replay area 210, which console entries were generated by the user device as the visual changes occurred during the user session. For example, the console log area 440 can include a console log identifier element 446 that is displayed next to a page or console log entry. The evaluation apparatus 110 can move the console log identifier element 446 during playback of the user session so that the console log identifier element 446 is displayed next to the appropriate page or console log entry.

For example, when a page (or native application view) is loaded in the user session in the playback of the user session, the evaluation apparatus 110 can present the name and/or URL (or other identifier) of the page in the console log identifier element 446, e.g., by scrolling the list of pages to the loaded page. In addition, the evaluation apparatus 110 can display the console log identifier element 446 next to the name or URL of the loaded page (or application interface) to indicate that the page presented in the playback corresponds to that URL or page name. In this example, the console log identifier element 446 is displayed by the URL for the features page as the features page is being presented in the playback of the user session in the session replay area 210.

When the playback of the user session reaches an event for which the console log for the page includes a console log entry, the evaluation apparatus 110 can move the console log identifier element 446 next to the console log entry for the event. In this way, the user can view the state of the page and visual changes that were occurring on the page at the time of the event. If the event is an error, the user can visualize the impact of the error on the user experience.

Similarly, when a user interacts with a console log entry, the evaluation apparatus 110 can cause the playback of the user session in the session replay area 210 to present the page of the user session at the time the console log entry was generated by the user device. For example, the evaluation apparatus 110 can fast forward or rewind the playback to the time at which the console log entry was generated (or a short amount of time before the entry was generated) so to present the visual changes to the page occurred when the console log entry was generated.

When a user requests the console view, e.g., by interacting with the console tab 442 or the dev tools control 205, the evaluation apparatus 110 can open the console log view based on the portion of the user session being presented in the playback of the user session in the session replay area 210 when the console tab 442 or dev tools control received the interaction. For example, the evaluation apparatus 110 can present, in the console log area 440, a portion of the list of pages that includes the page being presented in the playback of the user session. In addition, the evaluation apparatus 110 can display the console log identifier element 446 next to the page or appropriate console log entry. In this example, the user interacted with the dev tools control 205 while the features page was being presented. Thus, the console log view was opened with the features page being included in the portion of the list of pages presented in the console log area 440. In addition, the console log entries for the feature page are presented, e.g., as if a user interacted with the expansion control 445 for the features page.

Figure 5:
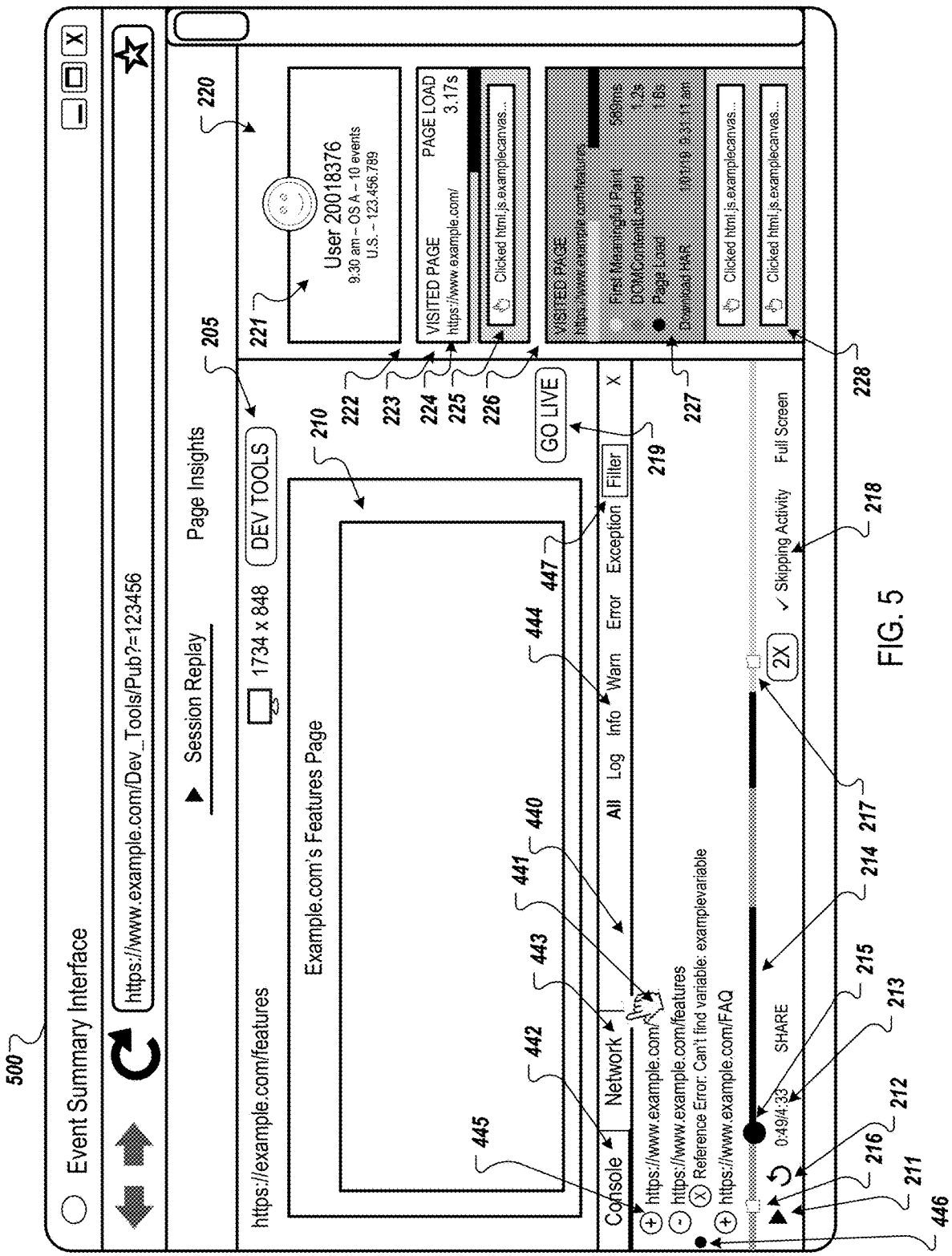
FIG. 5 is an illustration of another example interactive user interface for replaying a user session and presenting data related to events that occurred during the session.

FIG. 5 is an illustration of another example interactive user interface 500 for replaying a user session and presenting data related to events that occurred during the session. The user interface 500 is an updated version of the user interface 400 and includes many of the same elements at the user interface 400. In particular, the user interface 400 has been updated during playback of the session from 12 seconds into the user session to 49 seconds into the user session, as indicated by the counter 213 and the sliding element 215.

In this example, a reference error occurred in the user session between 12 seconds into the user session and 49 seconds into the user session. In response, the evaluation apparatus 110 has moved the console log identifier element 446 to a new position next to the console log entry for the reference error.

FIG. 6 is an illustration of another example interactive user interface 600 for replaying a user session and presenting data related to events that occurred during the session. The user interface 600 is an updated version of the user interface 500 and includes many of the same elements at the user interface 500. In particular, the user interface 500 has been updated in response to user interaction with the network view tab 443.

The user interface 600 includes a network request area 650 that presents a list of network requests 651 transmitted during the user session and by the user device on which the user session occurred. For each network request, the list of network requests 651 includes the status of the request, the type of the request, the user interface element requested by the request, the total load time for requesting and loading the user interface element.

The network request area 650 also includes a waterfall chart 645 that includes a bar for each network request. The bar for each network request indicates a time at which the network request was transmitted and the total load time for the network request. The waterfall chart 645 enables a user to quickly identify the user interface elements that are taking the longest durations of time to load. When bars are long (from left to right) this means that the request took longer, relatively, than the other requests in view in terms of time to complete, measured in milliseconds. When there are long gaps of space between bars, this means that no requests were taking place at that time, usually because scripts or another process was happening on the page.

In some implementations, the waterfall chart 645 can present successful requests using different visual characteristics than failed requests. For example, the bar for a successful request can be presented in a different color than a bar for a failed request. This enables users to quickly identify failed requests.

The network request area 640 also includes a filter menu 644 that enables a user to filter the list of network requests 651. The filter menu 644 enables a user to filter the network requests based on the type of request or the type of user interface element being requested. In this example, all network requests are being presented in the network request area as the "All" menu element is bolded. If a user interacts with the "CSS" menu element, only network requests for CSSs would be presented in the list of network requests 651. The filter menu 644 also includes a custom filter control 647 in which a user can specify a custom filter by which to filter the network requests.

Figure 7:
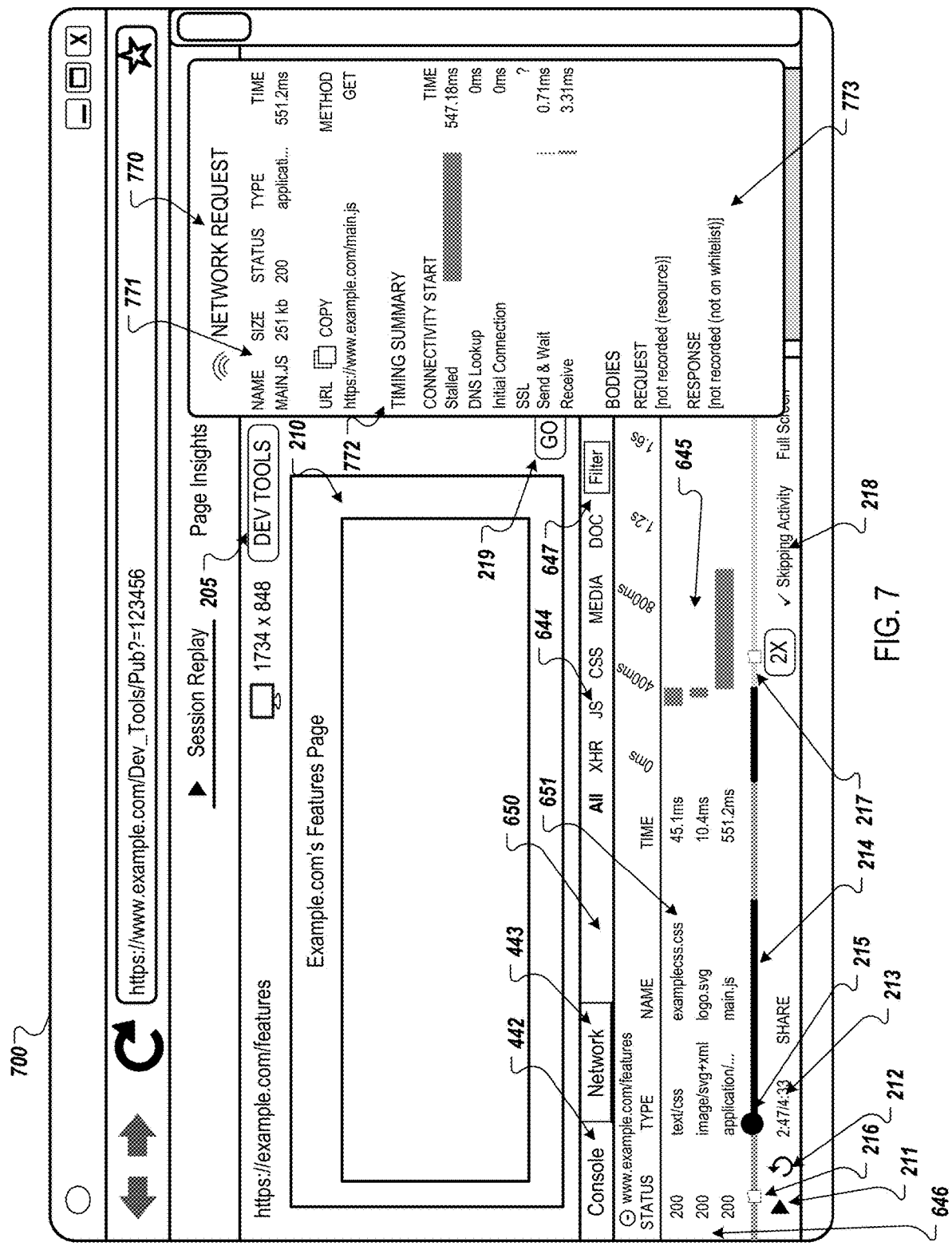
FIG. 7 is an illustration of another example interactive user interface for replaying a user session and presenting data related to events that occurred during the session.

Each network request in the list of network requests 651 can be interactive. For example, user interaction with a given network request can cause presentation of a network request details panel, as shown in FIG. 7.

The list of network requests 651 can be animated during playback of the user session, similar to the console entries in the console log area 440 of FIG. 4, to synchronize the presented network requests with the playback of the user session. For example, the evaluation apparatus 110 can scroll through the list of network requests 651 during the playback of the user session. The list of the network requests 651 can be scrolled such that, when the playback of the user session reaches a point at which a given network request was transmitted in the actual user session, the network request is shown in the list of network requests 651 in the network request area 640. In the illustrated example, the playback of the user session in the session replay area 210 is at a point in the user session at which the logo.svg image file was requested.

The evaluation apparatus 110 can also use an animation to specify, during playback of the visual changes to one or more user interfaces of the pages in the session replay area 210, which network requests were transmitted by the user device as the visual changes occurred during the user session. For example, the network request area 640 can include a network request identifier element 646 that is displayed next to one of the network requests. The network request identifier element 646 can be displayed next to the last network request that was transmitted during the actual user session prior to the page being presented in the actual user session having the same state as the page being presented in the playback of the user session.

For example, the network request identifier element 646 can be displayed next to the last network request that occurred prior to a time during the actual user session that corresponds to the time of the playback of the user session. In the illustrated example, the playback of the user session is at 2 minutes and 47 seconds into the user session based on the counter 213. In this example, the network request identifier element 646 can be displayed by the last network request that was transmitted prior to reaching 2 minutes and 47 seconds into the actual user session. The evaluation apparatus 110 can move the network request identifier element 546 during playback of the user session so that the network request identifier element 546 is displayed next to the appropriate page or console log entry.

Similarly, when a user interacts with a network request, the evaluation apparatus 110 can cause the playback of the user session in the session replay area 210 to present the page of the user session at the time the network request was generated by the user device. For example, the evaluation apparatus 110 can fast forward or rewind the playback to the time at which the network request was transmitted (or a short amount of time before the request was transmitted) so to present the visual changes to the page occurred when network request was transmitted.

FIG. 7 is an illustration of another example interactive user interface 700 for replaying a user session and presenting data related to events that occurred during the session. The user interface 700 is an updated version of the user interface 600 and includes many of the same elements at the user interface 600. In particular, the user interface 600 has been updated in response to user interaction with, e.g., selection of, the network request for the main.js user interface element in the list of network requests.

The user interface 700 includes a network request details panel 770 that includes additional details about the network request for the main.js script file. In particular, the network request details panel 770 includes the name of the user interface element requested by the network request (main.js), the size of the user interface element, the status of the network request, the type of user interface element requested, and the total load time for requesting and loading the user interface element.

The network request details panel 770 also includes a timing summary 772 that includes a summary of durations of time involved in requesting and loading the user interface element. These durations of time include a stall time duration that is a duration of time that the user device stalled before transmitting the network request., a DNS lookup time duration taken by the browser to perform a DNS lookup, an initial connection time duration that is a duration of time taken by the browser to establish an initial connection with a server from which the user interface element is being requested, an SSL time duration that is a duration of time taken by the browser to complete an SSL handshake with the server, a send and wait time duration that is a duration of time for an initial round-trip of the request, and a receive time duration that is the time spent receiving the rest of the data from the remote server.

The network request details panel 770 also includes a message bodies area 773 that can include content extracted from the message included in the request and/or content extracted from the message included in the response to the request. This enables a user to view data that was sent with the request and/or with the response, which can provide insights into why a request was slow. For example, the message body of response may include a large file that takes a long period of time to transmit over the network.

Figure 8:
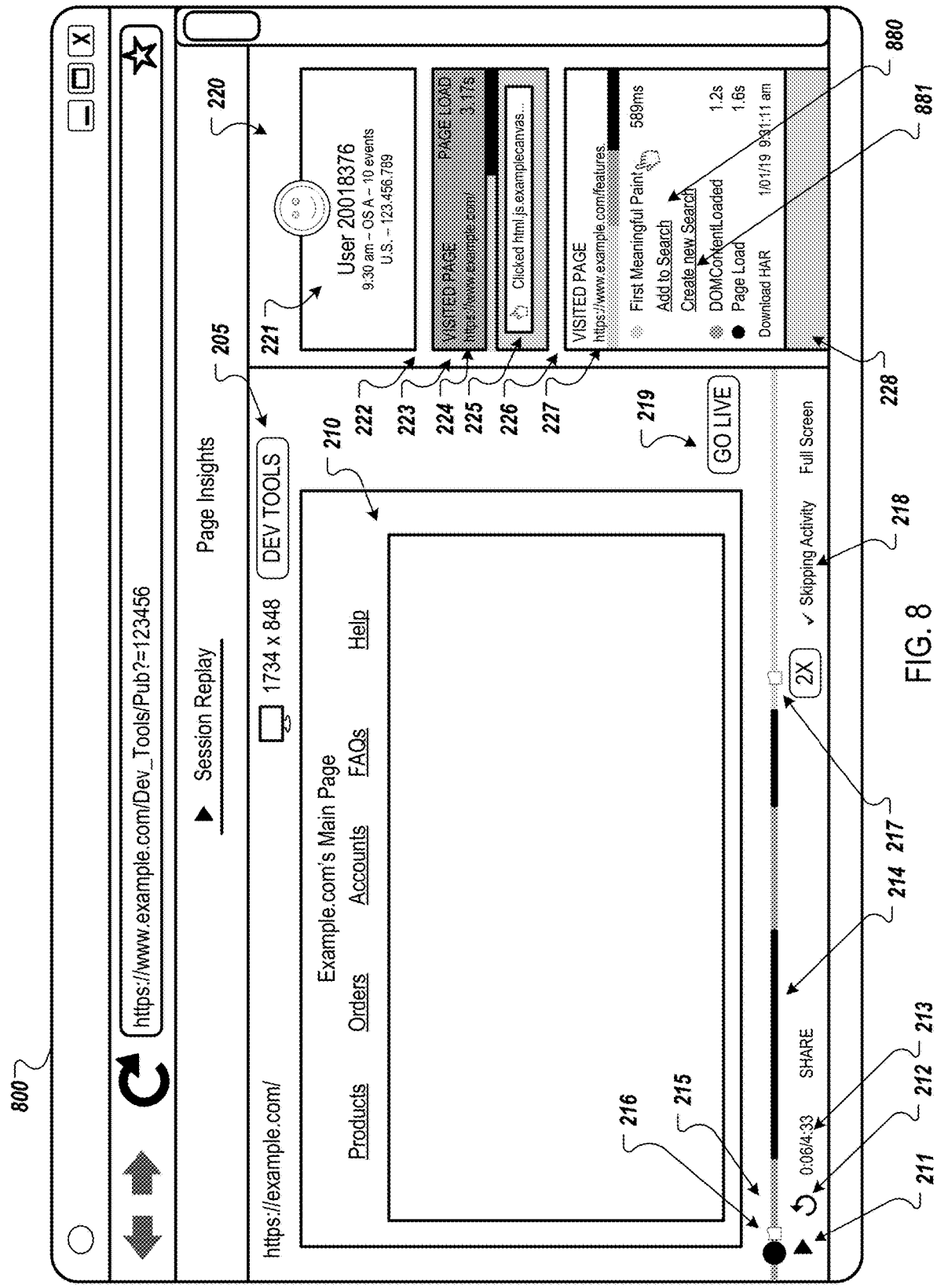
FIG. 8 is an illustration of another example interactive user interface for replaying a user session and presenting data related to events that occurred during the session.

FIG. 8 is an illustration of another example interactive user interface 800 for replaying a user session and presenting data related to events that occurred during the session. The user interface 800 is an updated version of the user interface 300 of FIG. 3 and includes search controls 880 and 881 that are presented in response to user interaction with the first meaningful paint metric of the page view element 227. These search controls enable a user to generate a search directly from the event stream area 222 and for other user sessions that include the same attribute. In this example, the add to search control 880 enables the user to add a first meaningful paint time threshold of 589 ms as search criteria for an existing search. This search will surface user sessions that have a first meaningful paint metric that is greater than or equal to 589 ms. Similarly, the create new search control 881 enables a user to create a new search using a first meaningful paint threshold of 589 ms as search criteria.

Figure 9:
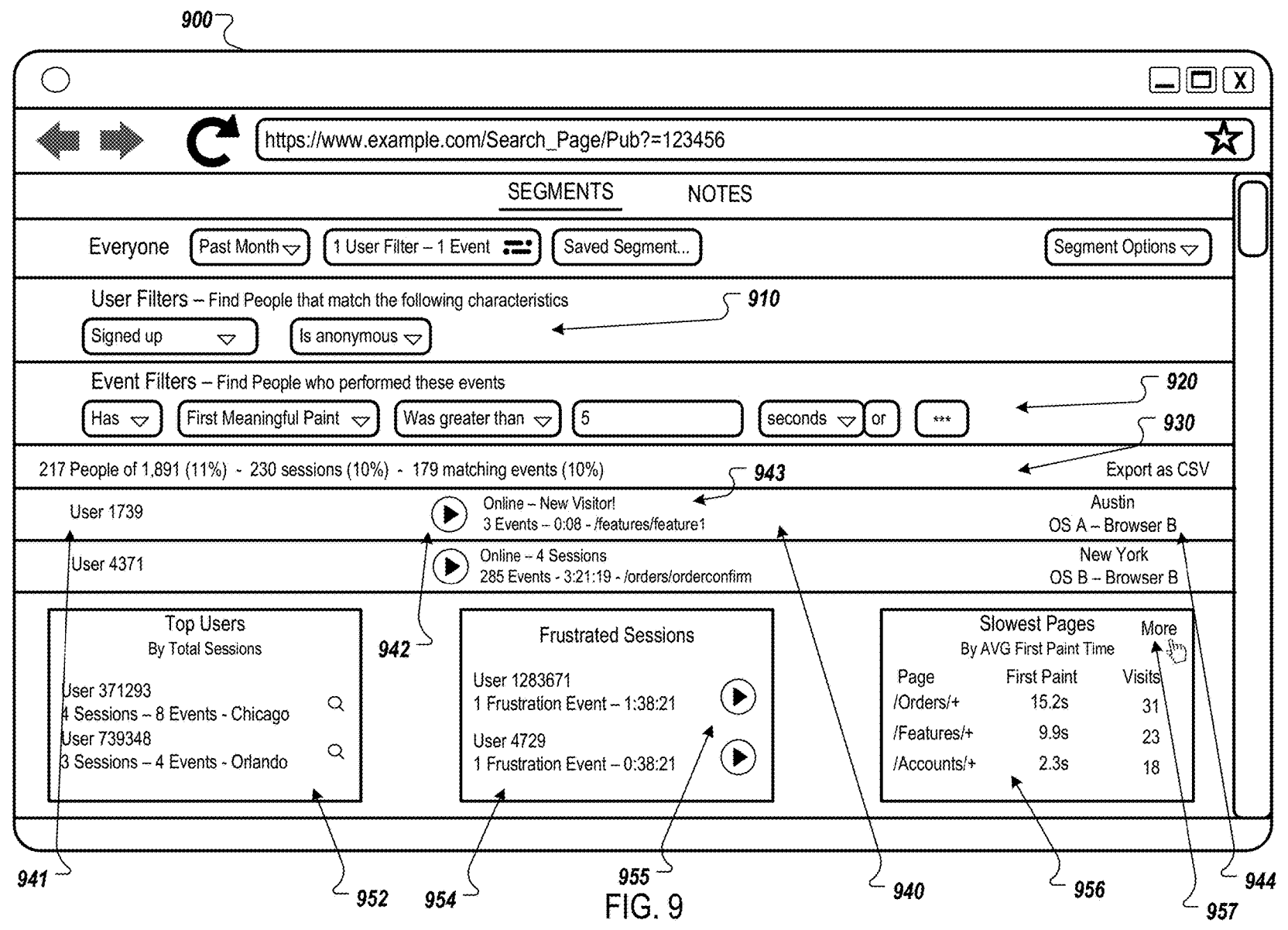

When a user interacts with these search controls 880 and 881, a search interface, e.g., the user interface 900 of FIG. 9 is activated. In addition, the evaluation apparatus 110 can obtain the appropriate search criteria and use the search criteria to populate a search query or to update an existing search. For example, if a user selects the add to search control 880, the user device presenting the user interface 800 can obtain the first meaningful paint metric of 589 ms and generate search criteria that specify a first meaningful paint metric of 589 ms. The user device can provide this search criteria to the evaluation apparatus 110. In turn, the evaluation apparatus can update an existing search query to include, in the search query (or search criteria) a first meaningful paint threshold of 589 ms, which can be used to refine the search results (e.g., by filtering out results that do not meet this threshold, or by identifying results that do meet this threshold). The evaluation apparatus 110 can also present a search interface that specifies the existing search query and the first meaningful paint search criteria. This reduces the data entry requirements of the user and increases the speed at which user sessions that meet the search criteria are presented to the user.

FIG. 9 is an illustration of an example interactive user interface 900 for searching for user sessions. The user interface 900 enables a publisher to search for user sessions in which users interacted with their pages using filters. The user interface 900 includes a user filter area 910 that includes user filter controls that enable a publisher to filter the user sessions based on user criteria, such as whether the users are signed up for an account with the publisher, whether the users are anonymous, age, geographic location, and/or other appropriate user criteria.

The user interface 900 also includes an event filters area 920 that includes event filer controls that enable a publisher to filter user sessions based on events that occurred during the user sessions. For example, the event filters can enable the publisher to filter the users sessions based on page speed metrics, e.g., first meaningful pain metrics, DOM content loaded metrics, and page load metrics, that meet a specified threshold, whether the user clicked a particular user interface element during the user session, whether a page was visited during the user session, and/or other appropriate event criteria. In this example, the filtering criteria specifies a search for user sessions in which the user is signed up and anonymous, and for which the first meaningful paint took more than five seconds.

The user interface 900 also includes matching user sessions data 930 that indicates the quantity and percentage of the users that match the search criteria specified by the filter controls, the quantity and percentage of user sessions that match the search criteria specified by the filter controls, and the quantity and percentage of events that match the search criteria specified by the filter controls.

The user interface 900 also includes a list of matching user sessions 940. For each matching user session, the list of matching user sessions 940 includes a user identifier 941 for the user of the user session and a playback control 942 that, when interacted with initiates playback of the user session, e.g., using the user interface 20 of FIG. 2. The list of matching user sessions 940 also includes, for each matching user session, an information element 943 that includes the online status of the user, the number of events in the user session, a duration of time of the user session, and a page at which the user session is currently or the last page presented before the session ended. The list of matching user sessions 940 also includes, for each matching user session, a user device information element 944 that include information about the user device at which the user session occurred, including the geographic location of the user device at the time of the user session, the operating system of the user device, and the type of browser on which the publisher's pages were presented during the user session.

The user interface 900 also includes a top users element that specifies the users that have the most user sessions that match the search criteria specified by the filter controls. This enables publishers to see if particular users or users in particular locations are involved in user sessions having specific attributes, e.g., first meaningful paint metrics that exceed a threshold.

The user interface 900 also includes a frustrated sessions element 954 that specifies user sessions that match the search criteria specified by the filter controls and in which at least one frustration event, e.g., a mouse rage event, occurred. The frustrated sessions element 954 also includes, for each frustrated session, a playback control 955 that, when interacted with, initiates playback of the frustrated session. This enables publishers to view the playback of user sessions that resulted in user frustration so that the publishers can improve the pages to prevent further user frustration.

The user interface 900 also includes a slowest pages element 956 that specifies the slowest loading pages in the user sessions that match the search criteria specified by the filter controls. For each of the slowest loading pages, the slowest pages element 956 also specifies an average first meaningful time for the page and a number of visits to the page. The average first meaningful paint time is an average of the first meaningful paint metrics for the page across each user session in which the page was presented. The slowest pages element 956 includes a link 957 that, when interacted with, cause presentation of a larger slowest pages visualization, as shown in FIG. 10.

In this example, the slowest pages are determined based on their average first meaningful paint times. More specifically, the slowest pages can be ranked based on their corresponding meaningful first meaningful paint times, and the ranking (from slowest to fastest) can be used to present the pages in descending order of first meaningful paint times. In other examples, the slowest pages can be determined using other page speed metrics, such as average DOM content loaded metrics or average page load metrics. The slowest pages determined using these metrics can be presented in a similar manner.

Figure 10:
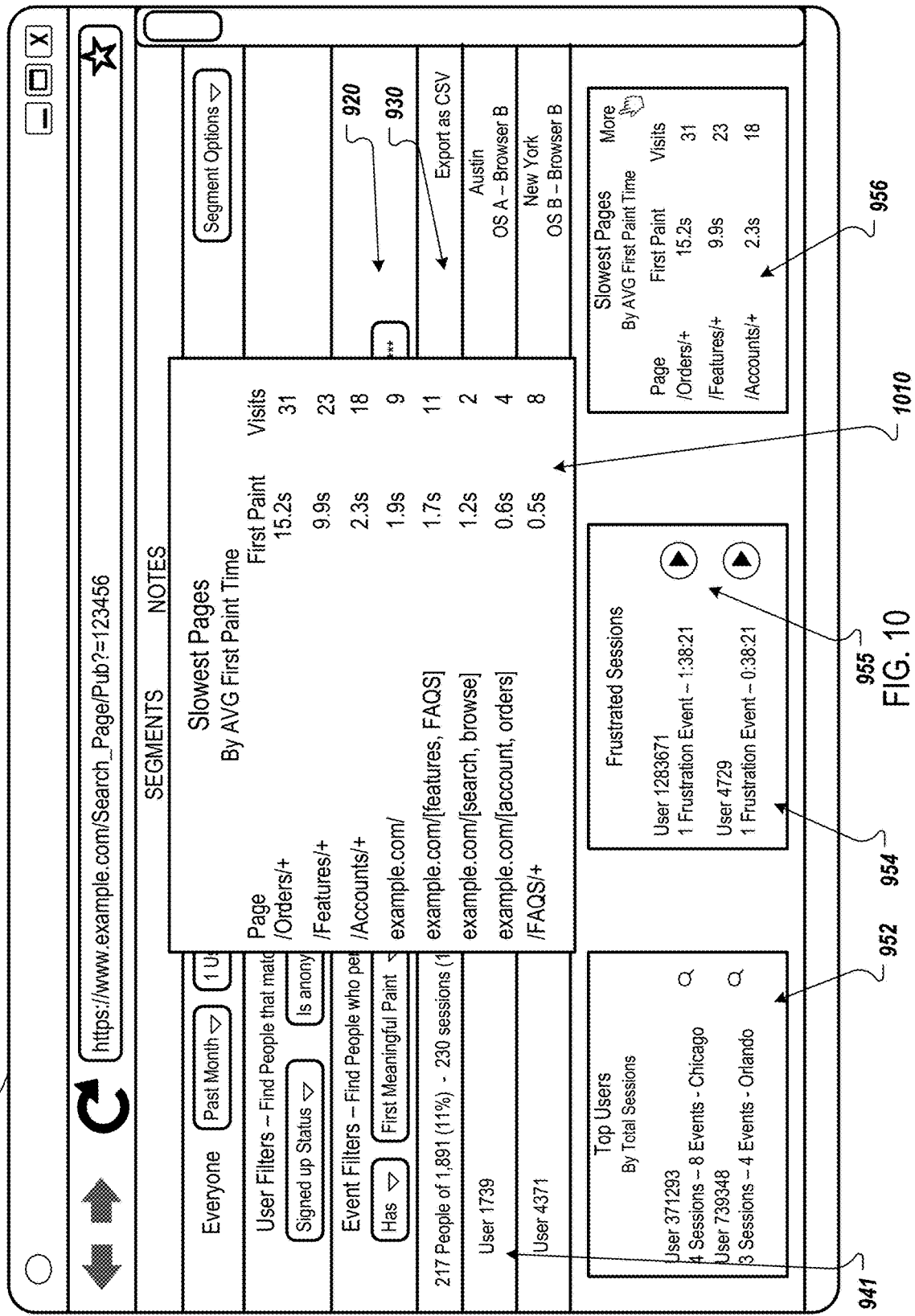
FIG. 10 is an illustration of an example user interface for presenting a list of slowest pages.

FIG. 10 is an illustration of an example user interface 1000 for presenting a list of slowest pages. The user interface 1000 is an updated version of the user interface 900 of FIG. 9 and includes a larger slowest pages visualization 1010. The slowest pages visualization 1010 includes an expanded list of the slowest pages of the publisher. The pages are identified using parameters and/or URLs. As described above, each page can be a logical page that may be referenced by dynamic URLs.

Figure 11:
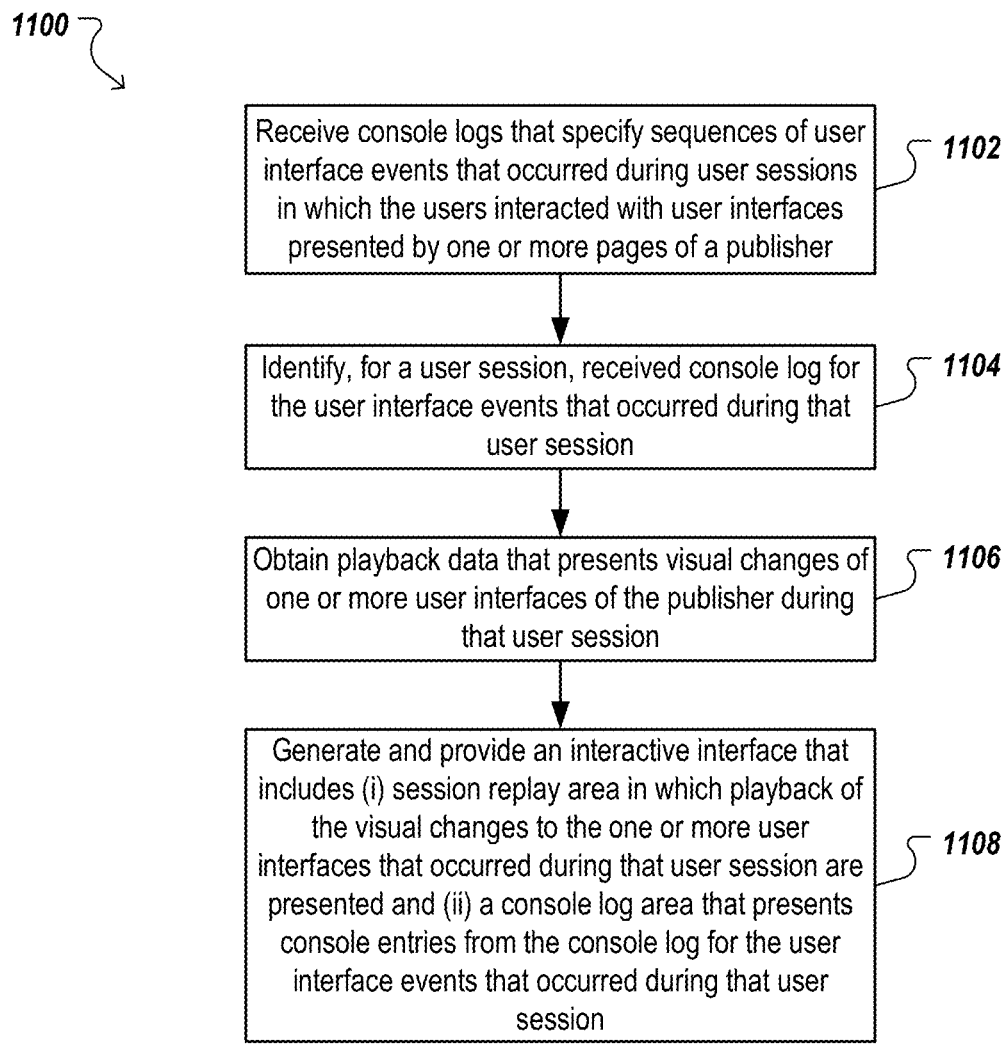
FIG. 11 is a flow chart of an example process for generating and providing an interactive user interface that includes a playback area and a console log area.

FIG. 11 is a flow chart of an example process 1100 for generating and providing an interactive user interface that includes a playback area and a console log area. Operations of the process 1100 can be performed, for example, by one or more data processing apparatus, such as the evaluation apparatus 110. Operations of the process 1100 can also be implemented as instructions stored on a non-transitory computer readable medium. Execution of the instructions cause one or more data processing apparatus to perform operations of the process 1100.

Console logs that specify sequences of user interface events are obtained (1102). The user interface events can be events, e.g., including errors, that occurred during user sessions in which users interacted with user interfaces presented by one or more pages of a publisher. For example, a user session can include presentation of multiple pages in response to the user of the user session selecting links or otherwise causing presentation of other pages. The console logs can include messages generated by a browser that presents the pages. The messages can include various types of events, including selections of user interface elements, e.g., images or links, warnings, errors, and/or other appropriate types of events. The console logs can also include, for each event, timestamp information that indicates a time at which the event occurred.

The console logs are generated client side at the user device. For example, the browser (or native application) presenting the page(s) can generate the console logs. The browser (or native application) can store the console logs locally at the user device. The user device can also provide the console logs to the evaluation apparatus 110. The evaluation apparatus 110 can store the console logs received from multiple user devices in a session data store.

The session data store can also store network request data for multiple user sessions that occurred on multiple user devices. The network request data for a user session can include data specifying each network request transmitted by the browser (or native application) during the user session. For each network request, the network request data can specify the user interface element that was requested by the network request, timestamp information that indicates a time at which the network request was transmitted, and one or more time durations associated with loading the requested user interface element.

The user device on which a user session occurred can store the network request data for the user session locally on the user device (e.g., in a memory/data structure at the client device). The user device can also provide the network request data to the evaluation apparatus 110, e.g., during the user session or after the user session ends.

A received console log is identified for a user session (1104). For example, a publisher may select the user session from a list of user sessions that were presented in response to search criteria defined by the publisher. In response, the console log(s) for the user session can be identified, e.g., from a session data store. For example, a data structure used to store console logs over time can be accessed to identify the appropriate console log, and that console log can be obtained (or otherwise accessed) from the data structure. The console log can then be used to perform various operations, as described throughout this document.

Playback data for the user session is generated (1106). The playback data for a user session can be generated from session replay data. The session replay data can include interface data that specifies a structure of a user interface that is presented at a user device during the session, user interaction data that specifies user interactions that are performed at the user device during the user session, and/or mutation data that specifies each element that is rendered by the user device and that can be used to reconstitute a DOM.

The playback data presents visual changes to the one or more user interfaces of the pages during the user session and other activity, e.g., mouse movements, that occurred during the user session. For example, the evaluation apparatus can create session playback data that when executed by a user device presents visual changes to the pages that correspond to events that occurred during the user session and that are specified by the session replay data.

Execution of the playback data can replay, at a user device, the initial page load using a reconstituted initial DOM. Execution of the playback data can also replay changes to the initial page, e.g., removal of an image, entry of text, etc., based on the user interaction data of the session replay data. If a second page was loaded during the user session, execution of the playback data by the user device can also cause the loading of the second page using a reconstituted DOM of the second page.

An interactive interface is generated and provided (1108). The interactive interface can include a session replay area in which the playback data presents the visual changes to the one or more user interfaces that occurred during the user session. For example, the user device can execute the playback data and present the playback of the user session in the session replay area of the interactive interface.

The interactive interface can also include a console log area that presents console entries from the console log for the user interface events that occurred during the user session. For example, the identified console log can be obtained from the data stricture, e.g., the session data store, and console entries from the identified console log can be presented in the console log area.

The interactive interface can also include an animation that visually specifies, during playback of the visual changes to the one or more user interfaces in the session replay area, which console entries in the console log were generated by the user device as the visual changes occurred during the user session. For example, as described above, a console log identifier element can be displayed next to a page or console log entry. The console log identifier element can be moved to different pages and console entries during playback of the user session so that the console log identifier element is displayed next to the appropriate page or console log entry, e.g., next to the entry that was generated by the user device as the visual changes being presented in the session replay area occurred during the user session.

In addition, the console log entries in the console log area can be scrolled during playback of the visual changes to the one or more user interfaces in the session replay area. For example, the identified console log can include more console log entries than can fit in the console log area. The console log entries can be scrolled such that, when an event specified by a console log entry is occurring in the playback in the session replay area, the console entry for the event is also being presented in the console log area.

The animation and scrolling can be synchronized with the playback of the visual changes to the one or more user interfaces in the session replay area based on timestamps for the console log entries and timestamps for the pages being presented in the playback and the user interactions being presented in the playback. For example, if a page was loaded twenty seconds into the user session and a console log entry was also logged at twenty seconds into the user session, the timestamps for these two events can be used by the user device presenting the interactive interface (or the evaluation apparatus 110) to synchronize the presentation of the console log entry in the console log area (and the animation) at the same time that the loading of the page is presented in the playback presented in the session replay area.

If a user interacts with one of the console log entries, the playback of the user session can jump to the time in the user session at which the console log entry was generated. For example, a user can scroll the console log entries in the console log area. If the user selects the console log entry for an event that occurred thirty seconds into the user session, the session replay area can present the portion of the playback of the user session that occurred thirty seconds into the user session.

As described above, the interactive interface can also present a list of network requests and associated information for the network requests, e.g., a load time for each network request. For example, the interactive interface can replace the presentation of the console entries with presentation of a list of network requests that were transmitted during the user session and their associated load times. User interaction with a network request can also cause presentation of additional data for the network request, such as a timing summary that includes various time durations associated with requesting and loading a user interface element requested by the network request. The list of network requests can also be animated to synchronize with the playback for the user session, similar to how the console logs entries are synchronized with the playback of the user session.

The network request data can be generated by a user device on which the user session occurred. This user device can store the network request data in local storage and send the network request data to the evaluation apparatus 110. The evaluation apparatus 110 can store the network request data in a data structure, e.g., a session data store. For example, a data structure used to store network request data over time can be accessed to identify the appropriate network request data, and that network request data can be obtained (or otherwise accessed) from the data structure. The network request data can then be used to perform various operations, as described throughout this document.

In some implementations, the user device at which the user session occurred can transmit, with the network request data, message body data that includes the content of the bodies of messages in the network requests and/or in the responses to the network requests. As the message bodies can include private or sensitive data, the user device can determine whether the data from the message bodies is whitelisted, e.g., by comparing the message field that includes the content, e.g., the tags between which the content is located, to the whitelist of data types (e.g., whitelist of message field that correspond to data types that can be transmitted to the evaluation apparatus 110). If data in a message body is not whitelisted, this data can be redacted from the network request data prior to transmitting the network request data to the evaluation apparatus 110. Each remaining portion of the message body, e.g., the data that is whitelisted, can be included in the network request data transmitted to the evaluation apparatus 110.

The interactive interface can also present the slowest loading page of a publisher, e.g., the publisher of the pages visited during the user session. For example, an average load time can be determined for each page of the publisher based on the measured load time for each page across multiple user sessions. The load times for each page can be stored in a data structure and accessed to determine the average load times for the pages. A set of slowest loading pages can be determined based on the average load times. The interactive interface can be updated to present data identifying the slowest loading pages, e.g., in response to user interaction with a user interface control.

The interactive interface can also be updated to present page speed metrics. The page speed metrics can include metrics that show page timing milestones for each page that loads during a user session. The page speed metrics can include a first meaningful paint metric, a DOM content loaded metric, and/or a page load metric. The page speed metrics can be stored in a data stricture and accessed, e.g., in response to selection of the page in an event stream of the interactive interface.

If a user interacts with one of the page speed metrics, a search can be created or updated based on the page speed metric. For example, if the user interacts with a user interface control to create a new search for the page load metric, a new search query that includes search criteria that specify the page load metric can be created and presented to the user. For example, the search criteria can specify a requirement that matching user sessions have a page load time that is equal to or greater than the page load metric. The user can then add or edit the search query prior to submitting the search query. A search interface can then be presented that includes data identifying and enabling playback of user sessions that match the search query.

For a slow loading page, the interactive interface can also present data indicating whether the user device presenting the page or the network caused the page to load slowly. For example, a given page that was presented during the user session and that had a load time that exceeds a threshold load time can be identified. To do this, durations of times taken to load user interface elements on the given page can be compared. For example, the durations of times can include one or more first time durations that each represent a duration of time for the user device to request or load the user interface element. The durations of times can also include and one or more second time durations that each represent a duration of time for the user interface element to be received by the user device in response to a request received from the user device. If the first time durations are greater than the second time durations, then the user device may be the cause of the slow loading page. If the second time durations are greater than the first time durations, then the network may be the cause of the slow loading page.

In another example, if one of the time durations for one or more of the user interface elements is substantially greater than (e.g., more than a threshold greater than) the other time durations, then the cause of the one time duration can be considered the cause of the slow loading page. In particular, if the stalled time duration for one or more user interface elements is substantially greater than the other time durations, e.g., the send and wait time durations and/or the receive time durations, this indicates that the user device caused the page to load slowly.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
    a data store; and
    one or more computers that interact with the data store and execute instructions that cause the one or more computers to perform operations comprising:
        receiving, from a client device, network request data that specifies, for each of a plurality of network requests that were generated by an application running on the client device and transmitted from the client device to a remote server during a user session, a requested data file for displaying one or more user interface elements requested by the network request and a load time that indicates a duration of time between a time at which the network request was initiated by the client device and a time at which the one or more user interface elements were loaded in a user interface at the client device using the requested data file, wherein the client device generates the network request data, by:
            identifying, for a given network request, at least one of (i) a request message body that includes data being transmitted with the given network request and by the client device or (ii) a received message body that includes data received by the client in response to the given network request;
            for each message body:
                examining the message body to identify, in the message body, one or more portions of data having a data type that is not included in a whitelist of data types; and
                in response to identifying the one or more portions of data having a data type that is not included in the whitelist of data types, removing each identified portion of data from the message body; and
                including, in the network request data, each remaining portion of data of the message body; and
        generating and providing an interactive interface that includes:
            a session replay area that presents playback of visual changes to the one or more user interfaces that occurred during the user session;
            a network request area that progresses with the playback of the visual changes to the one or more user interfaces that occurred during the user session and that presents, for multiple frames of the playback, a list of network requests that were transmitted, from the client device to the remote server, during the user session for multiple user interface elements presented concurrently in the frame and, for each network request in the list, the load time for the network request; and
            an animation that visually specifies, during playback of the visual changes to the one or more user interfaces in the session replay area, which network request in the list of network requests was initiated by the client device as the visual changes occurred during the user session.

2. The system of claim 1, wherein the network request area includes a waterfall chart that includes a bar for each network request in the list, the bar for each network request including a first end that indicates a time at which the network request was initiated and a second end that indicates a time at which the one or more user interface elements of the data file requested by the network request was loaded in the user interface, wherein a length of the bar between the first end and the second end indicates the load time for the network request.

3. The system of claim 1, wherein the animation comprises presenting a network request identifier element next to the network request in the list that was generated by the client device as the visual changes occurred during the user session.

4. The system of claim 1, wherein the operations comprise:
    detecting selection of a given network request in the list of network requests; and
    visually updating the interactive interface to present a network request details panel that includes a timing summary for the given network request, the timing summary including measured time durations for events related to requesting and loading a given user interface element that was requested by the given network request.

5. The system of claim 4, wherein the timing summary for the given network request includes one or more measured time durations for processes performed by the client device to request and load the given user interface element and one or more measured time durations related to waiting to receive the given user interface element from the remote server.

6. The system of claim 4, wherein the timing summary for the given network request includes data specifying the given user interface element and a data size of the given user interface element.

7. The system of claim 1, wherein the operations comprise:
  detecting user interaction with a given network request in the list of network requests; and
  causing the playback of the visual changes to the one or more user interfaces to present visual changes that occurred when the given network request was initiated.

8. The system of claim 1, wherein the interactive interface comprises an event stream area that includes information about pages presented by the client device during the user session, the information including, for a page that is being presented in the session replay area, page speed metrics that each indicate a duration of time taken to reach particular milestones in loading the page.

9. The system of claim 8, wherein the page speed metrics include a first meaningful paint metric that indicates a duration of time between a time at which the client device requests the page and a time at which the client device renders at least one of text, an image, or a canvas of the page at a display of the client device.

10. The system of claim 8, wherein the page speed metrics include a Document Model Object (DOM) content loaded metric that indicates a duration of time between a time at which the client device requests the page and a time at which the client device loads and parses an initial markup language document of the page.

11. The system of claim 8, wherein the page speed metrics include a page load metric that indicates a duration of time between a time at which the client device requests the page and a time at which the client device renders an entirety of the page.

12. A method, comprising:
  receiving, from a client device, network request data that specifies, for each of a plurality of network requests that were generated by an application running on the client device and transmitted from the client device to a remote server during a user session, a requested data file for displaying one or more user interface elements requested by the network request and a load time that indicates a duration of time between a time at which the network request was initiated by the client device and a time at which the one or more user interface elements were loaded in a user interface at the client device using the requested data file, wherein the client device generates the network request data, by:
    identifying, for a given network request, at least one of (i) a request message body that includes data being transmitted with the given network request and by the client device or (ii) a received message body that includes data received by the client in response to the given network request;
    for each message body:
      examining the message body to identify, in the message body, one or more portions of data having a data type that is not included in a whitelist of data types; and
      in response to identifying the one or more portions of data having a data type that is not included in the whitelist of data types, removing each identified portion of data from the message body; and
      including, in the network request data, each remaining portion of data of the message body; and
  generating and providing an interactive interface that includes:
    a session replay area that presents playback of visual changes to the one or more user interfaces that occurred during the user session;
    a network request area that progresses with the playback of the visual changes to the one or more user interfaces that occurred during the user session and that presents, for multiple frames of the playback, a list of network requests that were transmitted, from the client device to the remote server, during the user session for multiple user interface elements presented concurrently in the frame and, for each network request in the list, the load time for the network request; and
    an animation that visually specifies, during playback of the visual changes to the one or more user interfaces in the session replay area, which network request in the list of network requests was initiated by the client device as the visual changes occurred during the user session.

13. The method of claim 12, wherein the network request area includes a waterfall chart that includes a bar for each network request in the list, the bar for each network request including a first end that indicates a time at which the network request was initiated and a second end that indicates a time at which the one or more user interface elements of the data file requested by the network request was loaded in the user interface, wherein a length of the bar between the first end and the second end indicates the load time for the network request.

14. The method of claim 12, wherein the animation comprises presenting a network request identifier element next to the network request in the list that was generated by the client device as the visual changes occurred during the user session.

15. The method of claim 12, further comprising:
  detecting selection of a given network request in the list of network requests; and
  visually updating the interactive interface to present a network request details panel that includes a timing summary for the given network request, the timing summary including measured time durations for events related to requesting and loading a given user interface element that was requested by the given network request.

16. The method of claim 15, wherein the timing summary for the given network request includes one or more measured time durations for processes performed by the client device to request and load the given user interface element and one or more measured time durations related to waiting to receive the given user interface element from the remote server.

17. The method of claim 15, wherein the timing summary for the given network request includes data specifying the given user interface element and a data size of the given user interface element.

18. A non-transitory computer readable medium storing instructions that upon execution by one or more computers cause the one or more computers to perform operations comprising:

receiving, from a client device, network request data that specifies, for each of a plurality of network requests that were generated by an application running on the client device and transmitted from the client device to a remote server during a user session, a requested data file for displaying one or more user interface elements requested by the network request and a load time that indicates a duration of time between a time at which the network request was initiated by the client device and a time at which the one or more user interface elements were loaded in a user interface at the client device using the requested data file, wherein the client device generates the network request data, by:

identifying, for a given network request, at least one of (i) a request message body that includes data being transmitted with the given network request and by the client device or (ii) a received message body that includes data received by the client in response to the given network request;

for each message body:

examining the message body to identify, in the message body, one or more portions of data having a data type that is not included in a whitelist of data types; and in response to identifying the one or more portions of data having a data type that is not included in the whitelist of data types, removing each identified portion of data from the message body; and including, in the network request data, each remaining portion of data of the message body; and generating and providing an interactive interface that includes:

a session replay area that presents playback of visual changes to the one or more user interfaces that occurred during the user session;

a network request area that progresses with the playback of the visual changes to the one or more user interfaces that occurred during the user session and that presents, for multiple frames of the playback, a list of network requests that were transmitted, from the client device to the remote server, during the user session for multiple user interface elements presented concurrently in the frame and, for each network request in the list, the load time for the network request; and an animation that visually specifies, during playback of the visual changes to the one or more user interfaces in the session replay area, which network request in the list of network requests was initiated by the client device as the visual changes occurred during the user session.

\* \* \* \* \*